(12) United States Patent
Teraoka

(10) Patent No.: US 8,508,866 B2
(45) Date of Patent: Aug. 13, 2013

(54) IMAGING LENS

(75) Inventor: Hiroyuki Teraoka, Kyoto (JP)

(73) Assignees: AAC Technologies Japan R&D Center, Kyoto (JP); AAC Acoustic Technologies (Shenzhen) Co., Ltd., Shenzhen (CN)

( * ) Notice: Subject to any disclaimer, the term of this patent is extended or adjusted under 35 U.S.C. 154(b) by 96 days.

(21) Appl. No.: 13/341,850

(22) Filed: Dec. 30, 2011

(65) Prior Publication Data
US 2012/0194927 A1    Aug. 2, 2012

(30) Foreign Application Priority Data
Jan. 31, 2011    (JP) .................................. 2011-018812

(51) Int. Cl.
*G02B 9/14* (2006.01)
*G02B 13/18* (2006.01)

(52) U.S. Cl.
USPC ............................................ 359/785; 359/716

(58) Field of Classification Search
USPC ........................................ 359/716, 753, 785
See application file for complete search history.

(56) References Cited

U.S. PATENT DOCUMENTS
2008/0165435 A1 *    7/2008    Huang et al. .................. 359/716

\* cited by examiner

*Primary Examiner* — William Choi
(74) *Attorney, Agent, or Firm* — Anova Law Group, PLLC

(57) ABSTRACT

An imaging lens includes, from an object-side to an image-side: a first lens of positive refractive power with a convex surface on the object-side, an aperture stop, a second lens of negative refractive power with a convex surface on the image-side and a meniscus shape, a third lens of positive refractive power with a convex surface on the object-side and a meniscus shape. Specified conditions are satisfied in order to enhance a high brightness and reduce aberrations.

4 Claims, 18 Drawing Sheets

Spherical Aberration

Sepherical Aberration

Sepherical Aberration

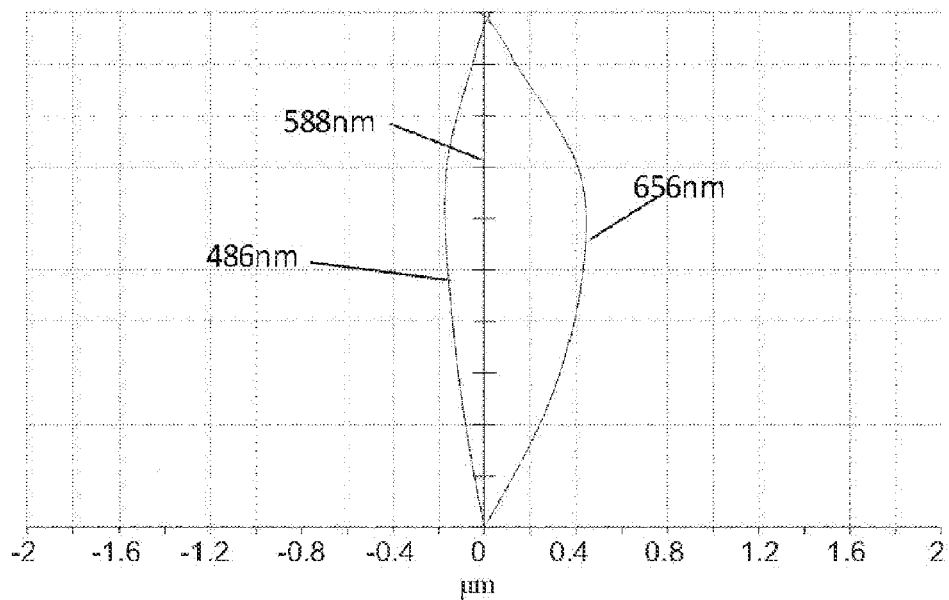
Fig. 35
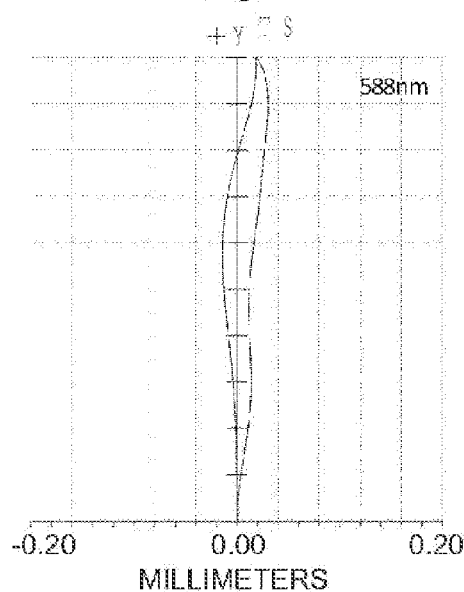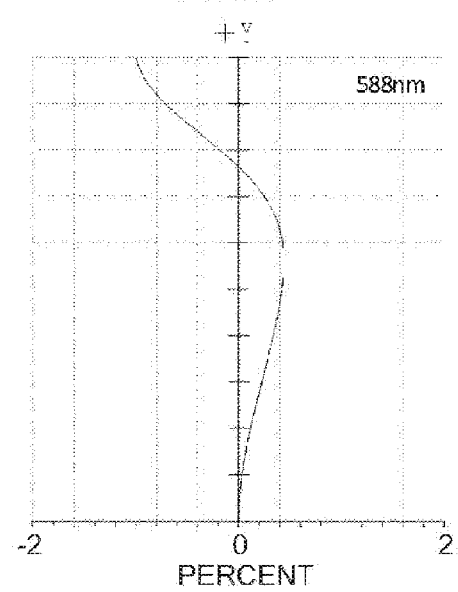
Fig. 36A
Fig. 36B

IMAGING LENS

BACKGROUND

1. Technical Field

The disclosure relates to imaging lenses and, particularly, to a compact imaging lens which has three lenses, a reduced total length, and a reduced aberration.

2. Description of Related Art

In recent years, an image pickup element, such as a CCD (Charge Coupled Device) or a CMOS (Complementary-Metal Oxide Semiconductor) is widely used. In order to obtain small-sized camera modules for use in thin devices, such as mobile phones, personal digital assistant (PDA), or webcams that can still capture quality images, zoom lens systems with high zoom ratio but short overall length are desired.

Factors affecting both the zoom ratio and the overall length of the imaging lens, such as, the number and state of lenses employed, the power distribution of the employed lenses, and the shape of each employed lens, complicates any attempts at increasing zoom ratios but shortening overall lengths of imaging lenses. For example, reducing the number of lenses can shorten the overall length of the imaging lens, but zoom ratio will suffer, conversely, increasing the number of lenses can increase zoom ratio, but increases overall length of the imaging lens.

Therefore, the demand is high to develop an imaging lens with a short overall length and an optical performance that matches image sensing chips having enhanced resolution.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

FIGS. 34~35 36A, 36B are graphs respectively showing spherical aberration, lateral color aberration, astigmatism and distortion of FIG. 33.

DETAILED DESCRIPTION

Embodiments of the disclosure will now be described in detail below, with reference to the accompanying drawings.

Figure 1:
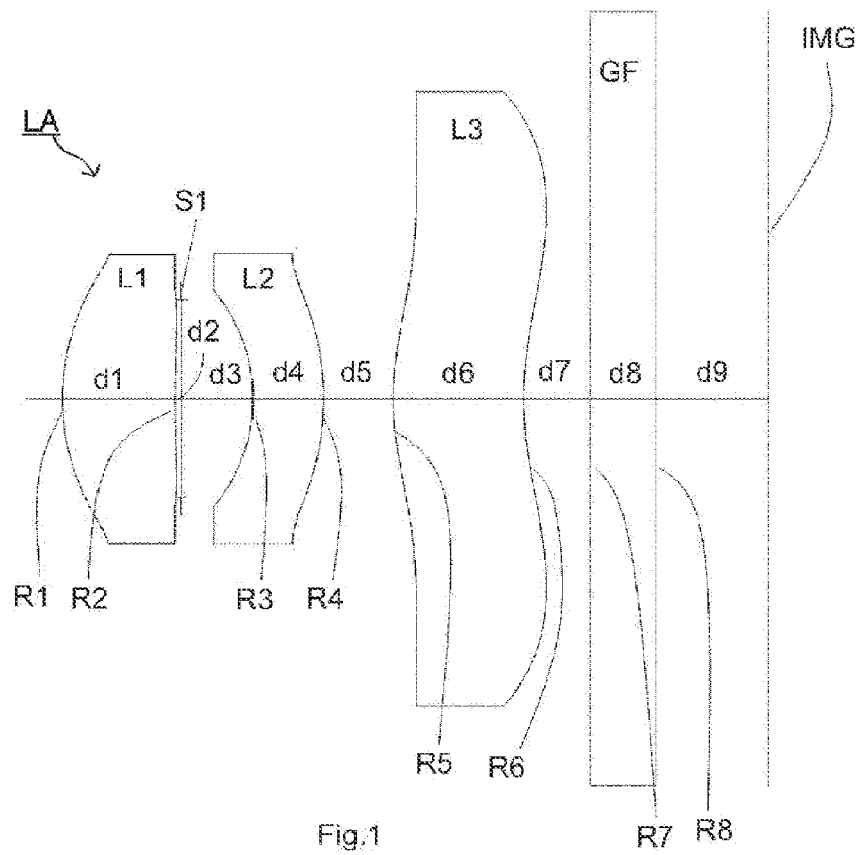
FIG. 1 is a schematic view of the imaging lens according to a first embodiment.

Referring to FIG. 1, an imaging lens LA according to a first embodiment, includes, in this order from the object-side to the image-side of the imaging lens LA, a first lens L1 of positive refraction power, an aperture stop S1, a second lens L2 of negative refraction power, a third lens L3 of positive refraction power, a color filter GF, and an image plane IMG. The aperture stop S1 is positioned between the first lens L1 and the second lens L2. The color filter GF is positioned between the third lens L3 and the image plane 30. The color filter GF can select from glass plate, or IR cut-off filter or low-pass filter.

The first lens L1 has a convex surface on the object-side and a meniscus shape, the second lens L2 has a convex surface on the image-side and a meniscus shape, and the third lens L3 has a convex surface on the image-side and a meniscus shape. In the present embodiment, in order to correct aberrations, each surface of the first, second, third lenses is aspherical.

The imaging lens LA satisfies the following condition formulas:

$$0.80 \leq f1/f \leq 0.87; \quad (1)$$

$$-2.00 \leq f2/f \leq -0.90; \quad (2)$$

$$0.35 \leq R3/R4 \leq 0.65; \quad (3)$$

$$0.01 \leq d2/d3 \leq 0.15; \quad (4)$$

$$0.08 \leq d5/f \leq 0.18; \quad (5)$$

Wherein: f is a focal length of the imaging lens; f1 is a focal length of the first lens L1; f2 is a focal length of the second lens L2; R3 is a radius of curvature of the object-side surface of the second lens L2; R4 is a radius of curvature of the image-side surface of the second lens L2; d2 is a distance between the image-side surface of the first lens L1 and the aperture stop S1 on the optical axis of imaging lens LA; d3 is a distance between the aperture stop S1 and the object-side surface of the second lens L2 on the optical axis of imaging lens LA; d5 is the distance between the image-side surface of the second lens L2 and the object-side surface of the third lens L3 on the optical axis of imaging lens LA.

The first condition (1) is configured for controlling the positive refraction power of the first lens L1. That is to say, when the ratio of the first condition (1) is smaller than the lower limit of the first condition (1), although it can effectively reduce the total length, the distortion is changed over a large range. By contraries, when ratio of the first condition (1) is greater than the upper limit of the first condition (1), the compact configuration is difficultly realized. So, when the ratio is met within the first condition (1), it not only can effectively reduce a total length of the imaging lens LA, but also can obtain low distortion, good imaging quality and a compact configuration.

The second condition (2) is configured for controlling the negative refraction power of the second lens L2. That is to say, when the ratio of the second condition (2) is smaller than the lower limit of the second condition (2), the coma aberration is difficult to correct. By contraries, when the ration of the second condition (2) is greater than the upper limit of the first condition (2), the distortion is changed over a large range.

The third condition (3) is configured for adjusting the shape of the second lens L2. When it is not satisfied the condition (3), it is not only difficult to control the negative refraction power of the second lens L2, but also difficult to correct the coma aberration.

The fourth condition (4) is configured for controlling the ratio that is the distance between the image-side surface of the first lens L1 and the aperture stop S1 on the optical axis of imaging lens LA, and the distance between the aperture stop S1 and the object-side surface of the second lens L2 on the optical axis of imaging lens LA. When the ratio is smaller than the lower limit of the fourth condition (4), the aperture stop S1 becomes too close to the image-side surface of the first lens L1, the flare aberration is easy obtained. By contraries, when the ratio is beyond the upper limit of the fourth condition (4), the incident angle of light rays onto the imaging surface becomes undesirably large, the coma aberration is difficultly to correct.

The fourth condition (5) is configured for controlling the ratio that is the a focal length of the imaging lens LA, and the distance between the image-side surface of the second lens L2 and the object-side surface of the third lens L3 on the optical axis of imaging lens LA. When the ratio is under the lower limit of the condition (5), although it can effectively reduce the total length and brightness the FNo (focal ratio number), the distortion is changed over a large range. By contraries, when the ratio is beyond the upper limit of the first condition (5), the compact configuration is difficultly realized.

To achieve the imaging lens LA with a short overall length and excellent optical performance, both the first lens L1 and the third lens L3 are positive refraction power, the imaging lens LA satisfies the following conditions:

$$1.10 \leq f3/f \leq 3.50; \tag{6}$$

$$0.11 \leq R1/R2 \leq 0.25; \tag{7}$$

Wherein: f is a focal length of the imaging lens; f3 is a focal length of the third lens L3; R1 is a radius of curvature of the object-side surface of the first lens L1; R2 is a radius of curvature of the image-side surface of the first lens L1.

The sixth condition (6) is configured for controlling the positive refraction power of the third lens L3. That is to say, when the positive refraction power of the third lens L3 is under the lower limit of the sixth condition (6), although it can effectively reduce the total length, the distortion is changed over a large range. By contraries, when the positive refraction power of the third lens L3 is beyond the upper limit of the sixth condition (6), the compact configuration is difficultly realized. So, when the sixth condition (6) is met, it not only can effectively reduce a total length of the imaging lens LA, but also can obtain low distortion, good imaging quality and a compact configuration.

The seventh condition (7) is configured for adjusting the shape of the first lens L. When the ratio is under the lower limit of the seventh condition (7), the compact configuration is difficultly realized. By contraries, when the ratio is beyond the upper limit of the seventh condition (7), the distortion is changed over a large range.

In order to obtain low distortion, good imaging quality, the imaging lens LA satisfies the following conditions:

$$30.00 \leq v1/v2 \leq 40.00; \tag{8}$$

Wherein v1 is the Abbe number of the first lens L1; v2 is the Abbe number of the second lens L2.

In the above conditions, though the overall length of the imaging lens LA is reduced, brightness of FNo (focal ratio number) is maintained within a little acceptable range, aberrations of the imaging lens LA are maintained within an acceptable range. That is, the imaging lens LA keeps chromatic aberrations at a minimum while reducing the total length of the imaging lens LA.

The first, second, and third lenses L1, L2, L3 are made of glass or resin. When using of glass manufacturing the lens, it is preferred to select the glass that the transfer temperature below 400 degrees to improve the durability of the lens.

The resin can efficiently manufacture the lens with complicated configuration relative to the glass. When the resin used to manufacture the lens, it can select the resin according to the ASTMD542 method for the determination of refractive index of d light in 1.500~1.670 range and wavelength in 450 nm~600 nm range, and the light transmittance of 80% or more, the best in more than 85%, such as thermoplastic resin, thermosetting resin. The first lens L1 and the third lens L3 can made of a same material or different material. The material of the second lens L2 is different from that of the first lens L1. The manufacture method of the resin can select from injection molding, compression molding or injection molding.

It is well known that the refractive index of the resin can be changed according to the different temperature. In order to suppress this changement, it is preferred to select the atomic resin with average particle size below 100 nm, best in 50 nm, such as silicon dioxide, acidification niobium, acidification aluminum, acidification titanium as the manufacturing material of lens.

The first, second and third lenses L1, L2, L3 made of resin each define an edge portion at the periphery thereof, the shape of the edge portion has no special requirement except do not affect the optical performance of the lenses. It is viewed from the forming process of the lenses, the thickness of the edge portion is preferably within the thickness in 70%~130% range of the periphery of the lens. The incident light onto the arch of the lens can cause ghosting and flash phenomenon. In this case, it can arrange emitter masks between the lenses to prevent incident light onto the arch according to what's needed.

Before the imaging lens LA is used in the lens modules, each surface of the lenses L1, L2, L3 can be coated films such as anti-reflective film, IR cut-off film or employed a surface hardening process. The lens modules with the imaging lens LA can be used in components such as digital cameras, WEB cameras, computers, cars.

Example diagrams of the imaging lens LA will be described below with reference to FIGS. 2-36B. It is to be understood that the disclosure is not limited to these examples. The following are symbols used in each exemplary embodiment.

f: the focal length of the imaging lens;
f1: the focal length of the first lens;
f2: the focal length of the second lens;

f3: the focal length of the third lens;
FNo: focal ratio number;
2ω: field angle;
R: curvature radius of each optical surface, it is referred to the center curvature radius of the imaging lens;
R1: curvature radius of the object-side surface of the first lens;
R2: curvature radius of the image-side surface of the first lens;
S1: aperture stop;
R3: curvature radius of the object-side surface of the second lens;
R4: curvature radius of the image-side surface of the second lens;
R5: curvature radius of the object-side surface of the third lens;
R6: curvature radius of the image-side surface of the third lens;
R7: curvature radius of the object-side surface of the color filter;
R8: curvature radius of the image-side surface of the color filter;
d: center thickness of each lens;
d1: center thickness of the first lens;
d2: distance between the image-side surface of the first lens and the aperture stop;
d3: distance between the aperture stop and the object-side surface of the second lens;
d4: center thickness of the second lens;
d5: distance between the image-side surface of the second lens and the object-side surface of the third lens;
d6: center thickness of the third lens;
d7: distance between the image-side surface of the third lens and the object-side surface of the color filter;
d8: center thickness of the color filter;
d9: distance between the image-side surface of the color filter and the image plane;
nd: refractive index of d light (wavelength: 588 nm);
n1: refractive index of d light in the first lens;
n2: refractive index of d light in the second lens;
n3: refractive index of d light in the third lens;
n4: refractive index of d light in the color filter;
vd: Abbe number of d light;
v1: Abbe number of the first lens;
v2: Abbe number of the second lens;
v3: Abbe number of the third lens;
v4: Abbe number of the color filter;
TTL: the total length of the imaging lens;
LB: distance between the image-side surface of the third lens and the image plane (including the thickness of the color filter);
IH: the height of the image.

Each surface of the first, second, third lenses L1, L2, L3 is aspherical surface. The aspherical surfaces are shaped according to the formula:

$$Y=(X^2/R)/[1+\{1-(K+1)(X^2/R^2)\}]+A4X^4+A6X^6+A8X^8+A10X^{10}+A12X^{12} \quad (9)$$

Wherein R is curvature radius on the optical axis of the imaging lens; k is conic constant; A4, A6, A8, A10, A12 all are aspheric constant; y is the optical axis of the light passing forward direction; x is an axis perpendicular to the optical axis. The aspheric surface of the lenses shaped according to the formula (9), but, not limited to shaped by the formula (9).

Tables 1-2 show a first specification of the first embodiment of the imaging lens LA.

TABLE 1

|    | R      | d         | nd |       | vd |       |
|----|--------|-----------|----|-------|----|-------|
| R1 | 0.998  | d1 = 0.510 | n1 | 1.544 | v1 | 56.12 |
| R2 | 5.714  | d2 = 0.026 |    |       |    |       |
| S1 | ∞      | d3 = 0.328 |    |       |    |       |
| R3 | −0.818 | d4 = 0.319 | n2 | 1.614 | v2 | 25.56 |
| R4 | −1.438 | d5 = 0.318 |    |       |    |       |
| F5 | 1.180  | d6 = 0.592 | n3 | 1.509 | v3 | 56.20 |
| R6 | 1.482  | d7 = 0.300 |    |       |    |       |
| R7 | ∞      | d8 = 0.300 | n4 | 1.517 | v4 | 64.17 |
| R8 | ∞      | d9 = 0.508 |    |       |    |       |

TABLE 2

| | conic constant | aspheric constant | | | | |
|---|---|---|---|---|---|---|
| | k | A4 | A6 | A8 | A10 | A12 |
| R1 | −1.2034E+00 | 5.6081E−02 | 6.1111E−01 | −2.6435E+00 | 5.6592E+00 | −8.5135E+00 |
| R2 | 0.0000E+00 | −2.2191E−01 | −1.8545E−01 | −2.2911E+00 | −1.1898E+00 | 1.1738E+01 |
| R3 | 4.3437E−01 | −4.4634E−01 | 1.4161E+00 | −2.2571E+00 | 3.2795E+01 | −9.2313E+01 |
| R4 | −6.3630E+00 | −1.1853E+00 | 4.6663E+00 | −1.2487E+01 | 2.6938E+01 | −2.2317E+01 |
| R5 | −9.2162E+00 | −2.8535E−01 | 2.0352E−01 | −4.3257E−02 | −1.4037E−02 | 6.5373E−03 |
| R6 | −6.9127E+00 | −1.7238E−01 | 3.9538E−02 | −1.2312E−04 | −6.4432E−03 | 1.2793E−03 |

Figure 2:
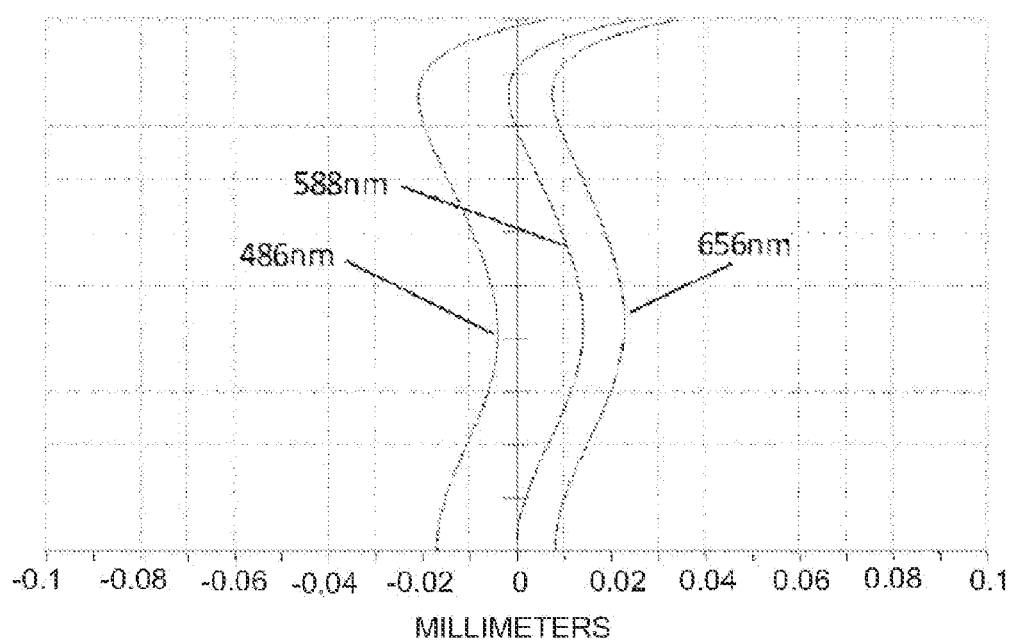
FIGS. 2~3, 4A, 4B are graphs respectively showing spherical aberration, lateral color aberration, astigmatism and distortion of FIG. 1.
Figure 3:
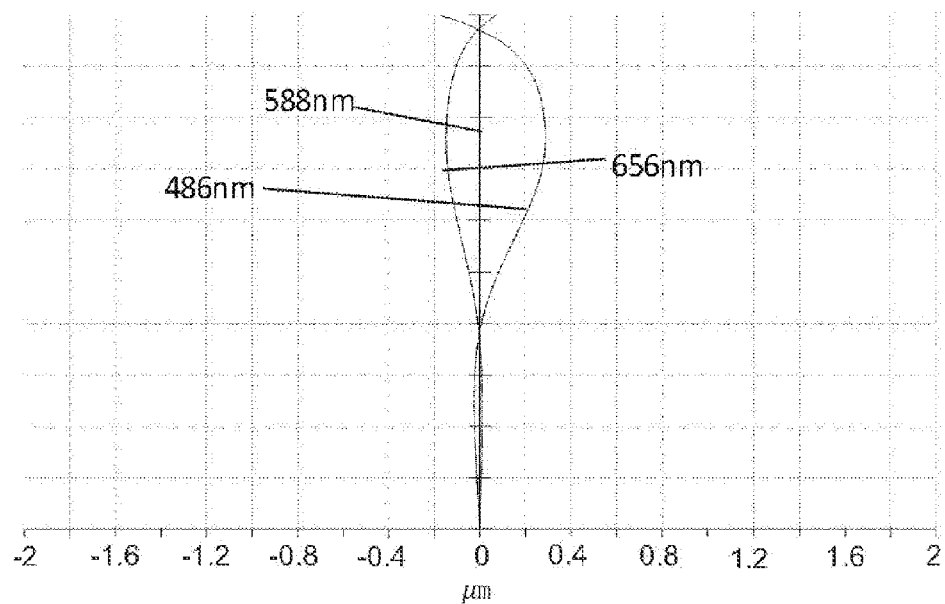
Figure 4A:
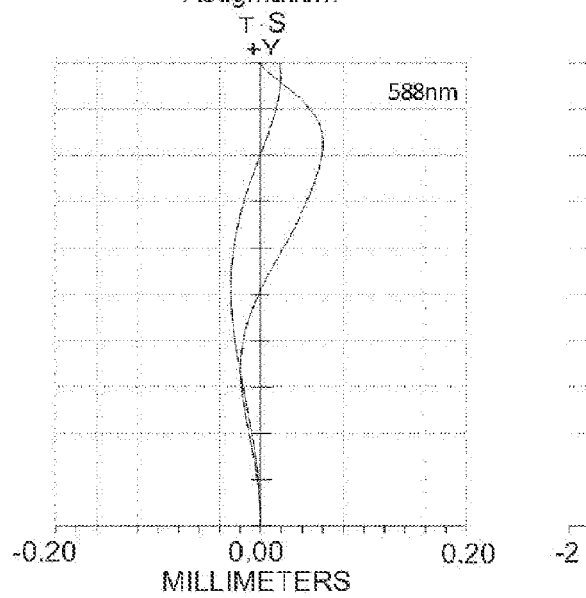
Figure 4B:
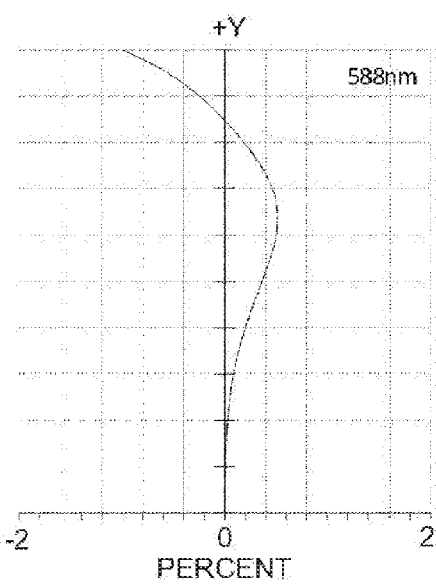

Referring to FIG. 1, an imaging lens LA according to a first embodiment is shown. FIGS. 2-4B, are graphs of aberrations (spherical aberration, lateral color aberration, astigmatism, and distortion) of the first specification of the first embodiment of the imaging lens LA. In FIGS. 2 and 3, curves are spherical aberration and lateral color aberration characteristic curves of F light (wavelength: 486 nm), d light (wavelength: 588 nm) and C light (wavelength: 656 nm) of the imaging lens LA. The spherical aberration of the first specification of the exemplary embodiment is from −0.1 mm to 0.1 mm, the lateral color aberration of the first specification of the exemplary embodiment is from −2 mm to 2 mm. As illustrated in FIG. 4A, the astigmatism is shown at the d light (wavelength: 588 nm) for both the sagittal image surface S and the tangential image surface T. The astigmatism of the first specification of the exemplary embodiment of the imaging lens LA is from −0.2 mm to 0.2 mm. In FIG. 4B, the distortion of the first specification of the exemplary embodiment of the imaging lens LA is from −2% to 2%.

In the first specification, not only the overall length of the imaging lens LA is reduced and the brightness is ensured (seen in Table 19, TTL=3.201 mm, FNo=2.4), but also aberrations of the imaging lens LA are maintained within an acceptable range. That is, the imaging lens LA keeps lateral color aberration at a minimum while reducing the total length of the imaging lens LA.

Tables 3-4 show a second specification of the second embodiment of the imaging lens LA.

TABLE 3

|  | R | d |  | nd |  | vd |
|---|---|---|---|---|---|---|
| R1 | 1.040 | d1 = 0.500 | n1 | 1.544 | v1 | 56.12 |
| R2 | 6.405 | d2 = 0.031 |  |  |  |  |
| S1 | ∞ | d3 = 0.327 |  |  |  |  |
| R3 | −0.839 | d4 = 0.317 | n2 | 1.614 | v2 | 25.56 |
| R4 | −1.401 | d5 = 0.307 |  |  |  |  |
| F5 | 1.156 | d6 = 0.600 | n3 | 1.509 | v3 | 56.20 |
| R6 | 1.485 | d7 = 0.300 |  |  |  |  |
| R7 | ∞ | d8 = 0.300 | n4 | 1.517 | v4 | 64.17 |
| R8 | ∞ | d9 = 0.503 |  |  |  |  |

TABLE 4

|  | conic constant | aspheric constant | | | | |
|---|---|---|---|---|---|---|
|  | k | A4 | A6 | A8 | A10 | A12 |
| R1 | −1.2598E+00 | 5.0260E−02 | 5.8930E−01 | −2.7185E+00 | 5.7310E+00 | −7.7797E+00 |
| R2 | 0.0000E+00 | −2.1175E−01 | −1.2370E−01 | −2.0081E+00 | −8.6545E−01 | 8.6243E+00 |
| R3 | 4.6018E−01 | −4.6332E−01 | 1.4955E+00 | −2.4391E+00 | 3.1131E+01 | −8.1501E+01 |
| R4 | −5.6392E+00 | −1.2048E+00 | 4.5754E+00 | −1.2537E+01 | 2.7176E+01 | −2.2471E+01 |
| R5 | −8.7906E+00 | −2.8425E−01 | 2.0446E−01 | −4.2252E−02 | −1.4272E−02 | 5.9492E−03 |
| R6 | −6.2227E+00 | −1.7196E−01 | 3.9675E−02 | 3.9232E−03 | −6.5416E−03 | 1.1043E−03 |

Figure 5:
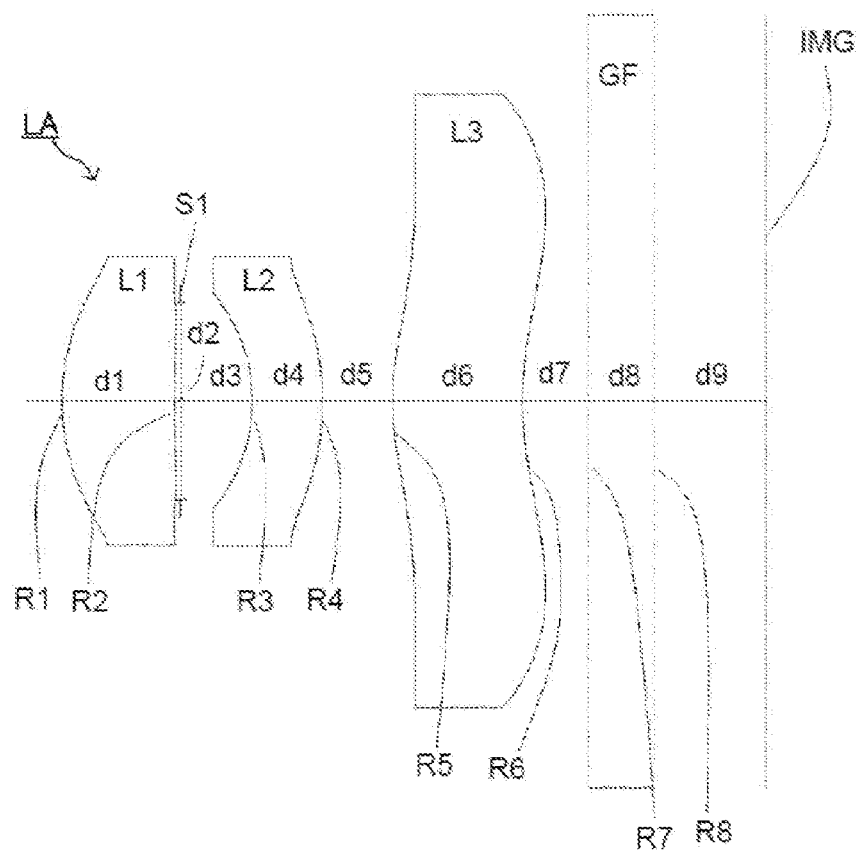
FIG. 5 is a schematic view of the imaging lens according to a second embodiment.
Figure 6:
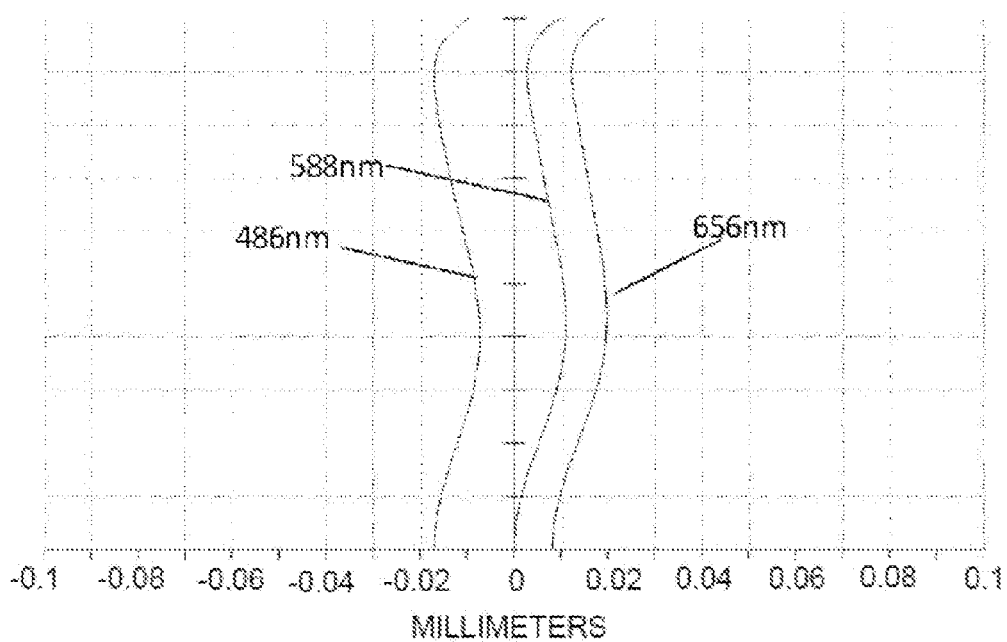
FIGS. 6~7, 8A, 8B are graphs respectively showing spherical aberration, lateral color aberration, astigmatism and distortion of FIG. 5.
Figure 7:
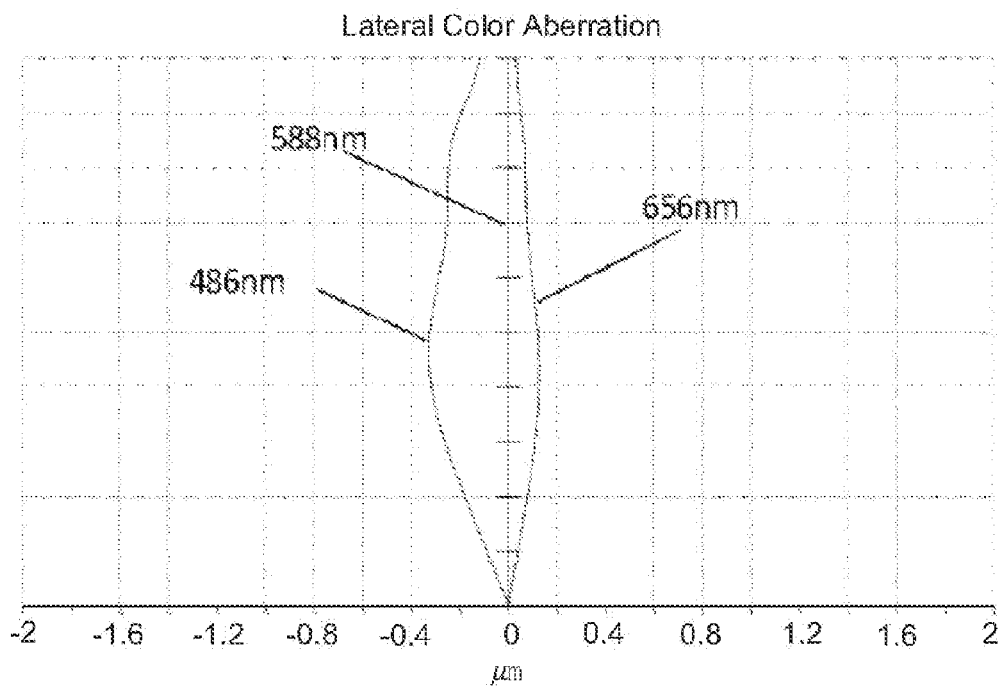
Figure 8A:
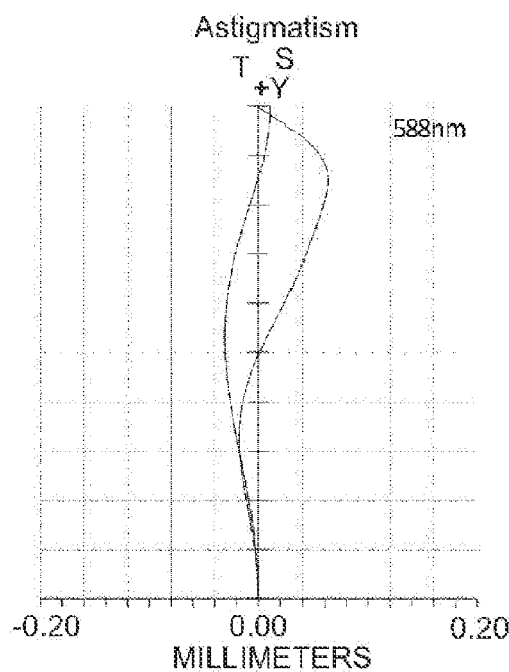
Figure 8B:
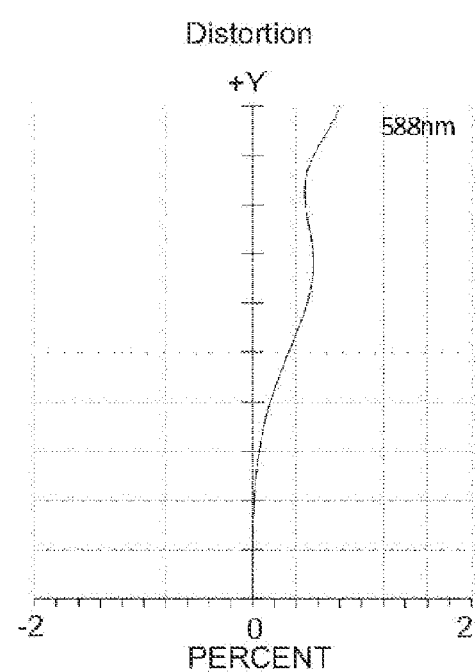

Referring to FIG. 5, an imaging lens LA according to a second embodiment is shown. FIGS. 6-8B, are graphs of aberrations (spherical aberration, lateral color aberration, astigmatism, and distortion) of the second specification of the second embodiment of the imaging lens LA. In FIGS. 6 and 7, curves are spherical aberration and lateral color aberration characteristic curves of F light (wavelength: 486 nm), d light (wavelength: 588 nm) and C light (wavelength: 656 nm) of the imaging lens LA. The spherical aberration of the second specification of the second embodiment is from −0.1 mm to 0.1 mm, the lateral color aberration of the second specification of the second embodiment is from −2 mm to 2 mm. As illustrated in FIG. 8A, the astigmatism is shown at the d light (wavelength: 588 nm) for both the sagittal image surface S and the tangential image surface T. The astigmatism of the second specification of the second embodiment of the imaging lens LA is from −0.2 mm to 0.2 mm. In FIG. 8B, the distortion of the second specification of the second embodiment of the imaging lens LA is from −2% to 2%.

In the second specification, not only the overall length of the imaging lens LA is reduced and the brightness is ensured (seen in Table 19, TTL=3.185 mm, FNo=2.4), but also aberrations of the imaging lens LA are maintained within an acceptable range. That is, the imaging lens LA keeps lateral color aberration at a minimum while reducing the total length of the imaging lens LA.

Tables 5-6 show a third specification of the third embodiment of the imaging lens LA.

TABLE 5

|  | R | d |  | nd |  | vd |
|---|---|---|---|---|---|---|
| R1 | 1.033 | d1 = 0.455 | n1 | 1.544 | v1 | 56.12 |
| R2 | 6.057 | d2 = 0.027 |  |  |  |  |
| S1 | ∞ | d3 = 0.336 |  |  |  |  |
| R3 | −0.845 | d4 = 0.302 | n2 | 1.614 | v2 | 25.56 |

TABLE 5-continued

|  | R | d |  | nd |  | vd |
|---|---|---|---|---|---|---|
| R4 | −1.341 | d5 = 0.346 |  |  |  |  |
| F5 | 1.192 | d6 = 0.574 | n3 | 1.509 | v3 | 56.20 |
| R6 | 1.404 | d7 = 0.300 |  |  |  |  |
| R7 | ∞ | d8 = 0.300 | n4 | 1.517 | v4 | 64.17 |
| R8 | ∞ | d9 = 0.538 |  |  |  |  |

TABLE 6

|  | conic constant | aspheric constant | | | | |
|---|---|---|---|---|---|---|
|  | k | A4 | A6 | A8 | A10 | A12 |
| R1 | −1.2360E+00 | 5.0492E−02 | 4.8937E−01 | −2.6361E+00 | 5.7498E+00 | −9.4256E+00 |
| R2 | 0.0000E+00 | −2.3030E−01 | −2.5157E−01 | −1.9117E+00 | −1.5109E−01 | 6.6024E+00 |
| R3 | 5.5250E−01 | −4.8237E−01 | 2.1707E+00 | −4.2485E+00 | 3.2164E+01 | −7.0376E+01 |
| R4 | −6.9540E+00 | −1.1938E+00 | 4.5808E+00 | −1.2122E+01 | 2.7367E+01 | −2.3475E+01 |
| R5 | −8.6513E+00 | −2.8216E−01 | 2.0545E−01 | −4.2108E−02 | −1.4424E−02 | 6.3285E−03 |
| R6 | −6.4162E+00 | −1.7019E−01 | 4.0050E−02 | 3.6490E−03 | −6.6021E−03 | 1.1430E−03 |

Figure 9:
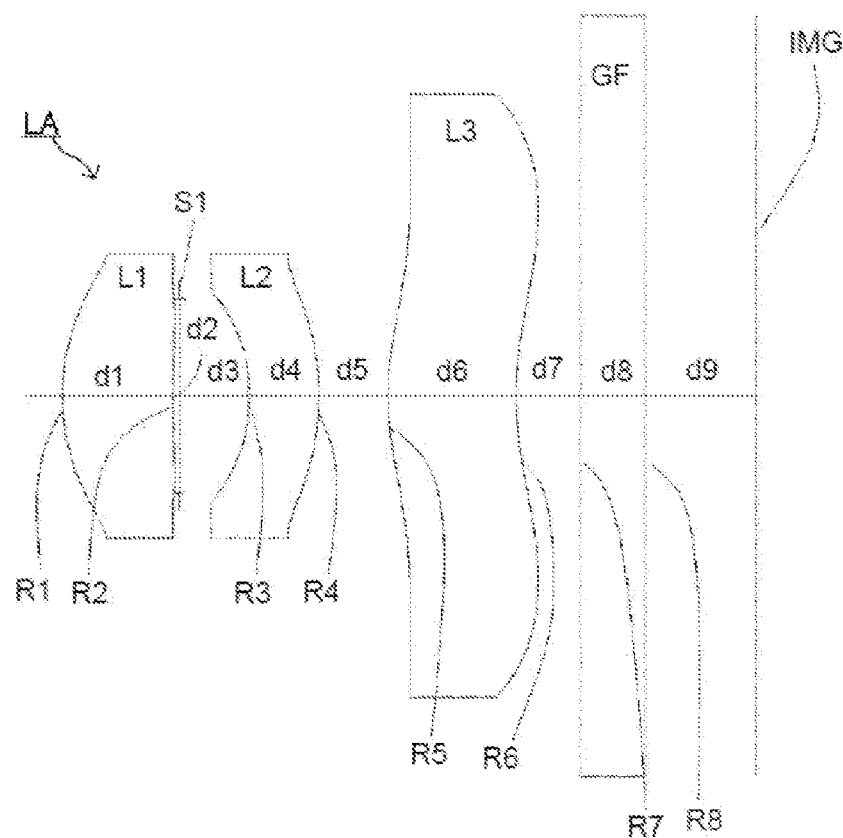
FIG. 9 is a schematic view of the imaging lens according to a third embodiment.
Figure 10:
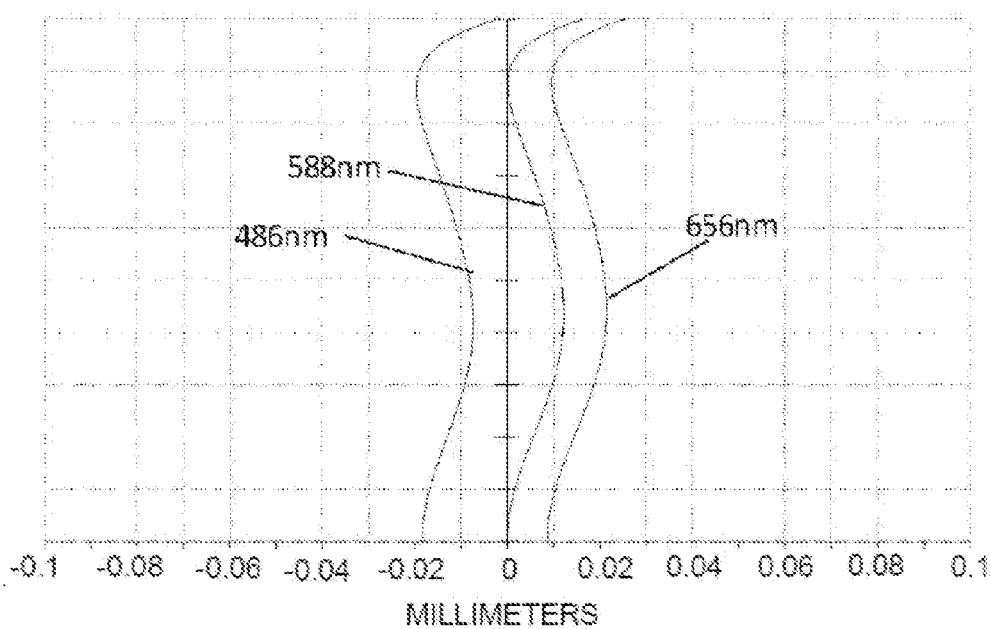
FIGS. 10~11, 12A, 12B are graphs respectively showing spherical aberration, lateral color aberration, astigmatism and distortion of FIG. 9.
Figure 11:
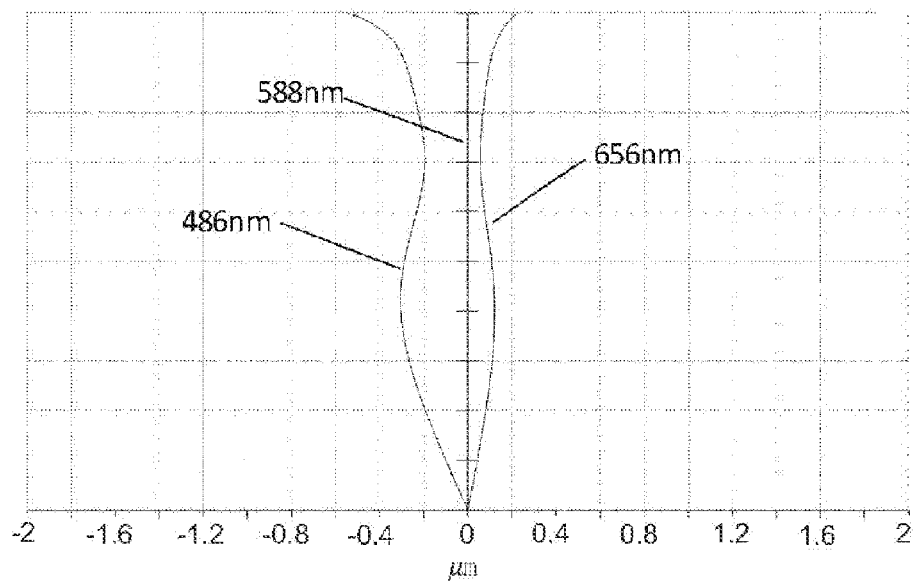
Figure 12A:
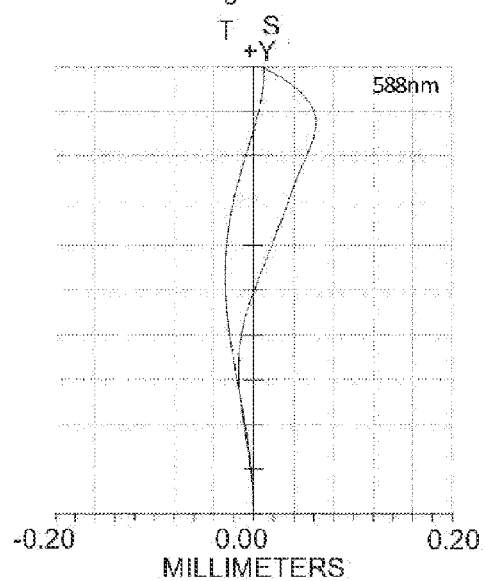
Figure 12B:
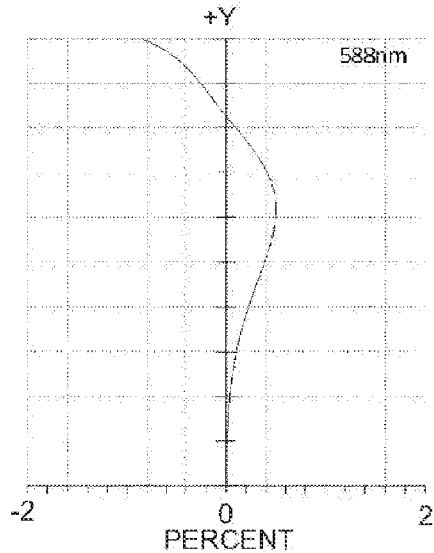

Referring to FIG. 9, an imaging lens LA according to a third embodiment is shown. FIGS. 10-12B, are graphs of aberrations (spherical aberration, lateral color aberration, astigmatism, and distortion) of the third specification of the third embodiment of the imaging lens LA. In FIGS. 10 and 11, curves are spherical aberration and lateral color aberration characteristic curves of F light (wavelength: 486 nm), d light (wavelength: 588 nm) and C light (wavelength: 656 nm) of the imaging lens LA. The spherical aberration of the third specification of the exemplary embodiment is from −0.1 mm to 0.1 mm, the lateral color aberration of the third specification of the exemplary embodiment is from −2 mm to 2 mm. As illustrated in FIG. 12A, the astigmatism is shown at the d light (wavelength: 588 nm) for both the sagittal image surface S and the tangential image surface T. The astigmatism of the third specification of the exemplary embodiment of the imaging lens LA is from −0.2 mm to 0.2 mm. In FIG. 12B, the distortion of the third specification of the exemplary embodiment of the imaging lens LA is from −2% to 2%.

In the third specification, not only the overall length of the imaging lens LA is reduced and the brightness is ensured (seen in Table 19, TTL=3.178 mm, FNo=2.4), but also aberrations of the imaging lens LA are maintained within an acceptable range. That is, the imaging lens LA keeps lateral color aberration at a minimum while reducing the total length of the imaging lens LA.

Tables 7-8 show a fourth specification of the fourth embodiment of the imaging lens LA.

TABLE 7

| | R | d | | nd | | vd |
|---|---|---|---|---|---|---|
| R1 | 1.024 | d1 = | 0.495 | n1 | 1.544 | v1 | 56.12 |
| R2 | 5.221 | d2 = | 0.032 | | | | |
| S1 | ∞ | d3 = | 0.360 | | | | |
| R3 | −0.797 | d4 = | 0.287 | n2 | 1.614 | v2 | 25.56 |
| R4 | −1.848 | d5 = | 0.256 | | | | |
| F5 | 1.053 | d6 = | 0.748 | n3 | 1.509 | v3 | 56.20 |
| R6 | 2.143 | d7 = | 0.300 | | | | |
| R7 | ∞ | d8 = | 0.300 | n4 | 1.517 | v4 | 64.17 |
| R8 | ∞ | d9 = | 0.572 | | | | |

TABLE 8

| | conic constant | aspheric constant | | | | |
|---|---|---|---|---|---|---|
| | k | A4 | A6 | A8 | A10 | A12 |
| R1 | −1.0383E+00 | 7.2371E−02 | 4.1697E−01 | −2.3518E+00 | 5.8478E+00 | −8.7641E+00 |
| R2 | 0.0000E+00 | −2.1652E−01 | −7.7280E−02 | −2.1569E+00 | −1.1301E+00 | 8.9414E+00 |
| R3 | 1.0368E+00 | −4.5819E−01 | 2.6573E+00 | −3.8581E+00 | 3.5300E+01 | −4.0104E+01 |
| R4 | 6.9954E−01 | −1.2961E+00 | 4.8499E+00 | −1.1644E+01 | 2.4362E+01 | −0.0136E+01 |
| R5 | −9.4220E+00 | −2.7911E−01 | 2.0412E−01 | −4.4641E−02 | −1.3740E−02 | 7.5883E−03 |
| R6 | −4.9248E+00 | −1.8505E−01 | 3.7490E−02 | −3.3065E−04 | −5.6239E−03 | 1.6039E−03 |

Figure 13:
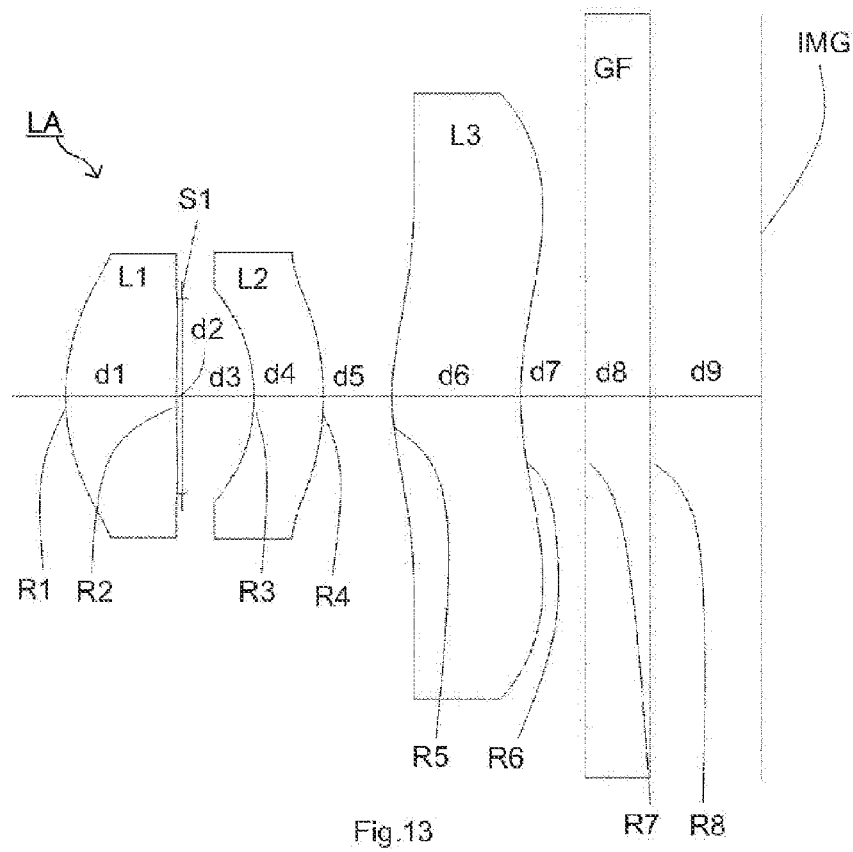
FIG. 13 is a schematic view of the imaging lens according to a fourth embodiment.
Figure 14:
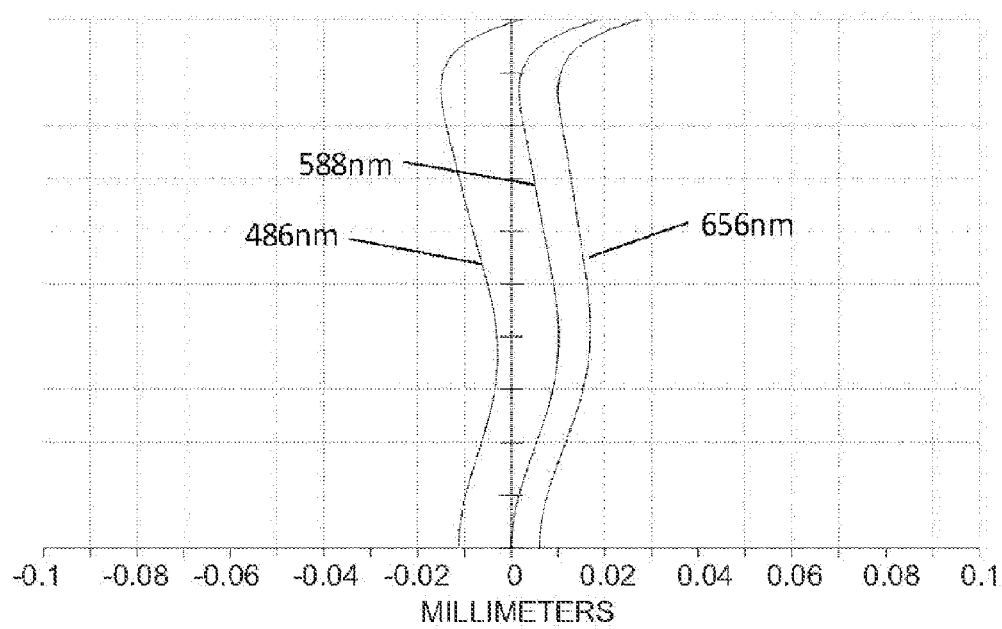
FIGS. 14~15 16A, 16B are graphs respectively showing spherical aberration, lateral color aberration, astigmatism and distortion of FIG. 13.
Figure 15:
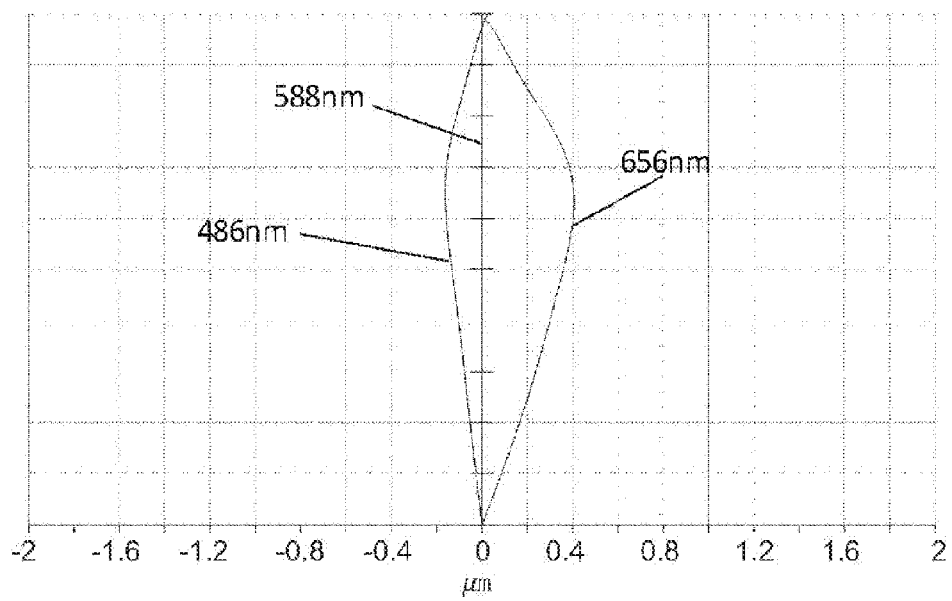
Figure 16A:
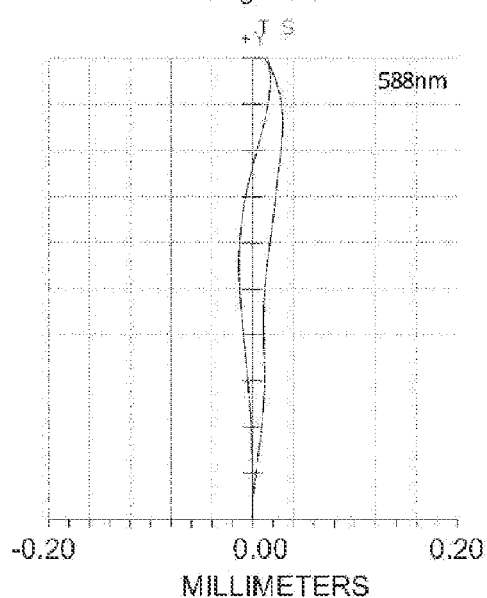
Figure 16B:
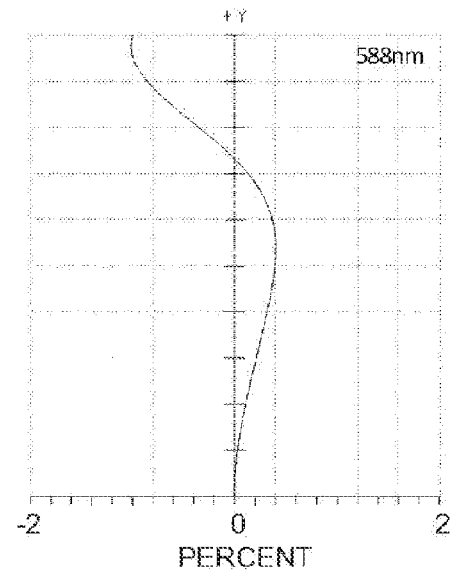

Referring to FIG. 13, an imaging lens LA according to a fourth embodiment is shown. FIGS. 14-16B, are graphs of aberrations (spherical aberration, lateral color aberration, astigmatism, and distortion) of the fourth specification of the exemplary embodiment of the imaging lens LA. In FIGS. 14 and 15, curves are spherical aberration and lateral color aberration characteristic curves of F light (wavelength: 486 nm), d light (wavelength: 588 nm) and C light (wavelength: 656 nm) of the imaging lens LA. The spherical aberration of the fourth specification of the exemplary embodiment is from −0.1 mm to 0.1 mm, the lateral color aberration of the fourth specification of the exemplary embodiment is from −2 mm to 2 mm. As illustrated in FIG. 16A, the astigmatism is shown at the d light (wavelength: 588 nm) for both the sagittal image surface S and the tangential image surface T. The astigmatism of the fourth specification of the exemplary embodiment of the imaging lens LA is from −0.2 mm to 0.2 mm. In FIG. 16B, the distortion of the first specification of the exemplary embodiment of the imaging lens LA is from −2% to 2%.

In the fourth specification, not only the overall length of the imaging lens LA is reduced and the brightness is ensured (seen in Table 19, TTL=3.350 mm, FNo=2.4), but also aberrations of the imaging lens LA are maintained within an acceptable range. That is, the imaging lens LA keeps lateral color aberration at a minimum while reducing the total length of the imaging lens LA.

Tables 9-10 show a fifth specification of the fifth embodiment of the imaging lens LA.

TABLE 9

| | R | d | | nd | | vd |
|---|---|---|---|---|---|---|
| R1 | 1.018 | d1 = | 0.456 | n1 | 1.544 | v1 | 56.12 |
| R2 | 5.608 | d2 = | 0.033 | | | | |
| S1 | ∞ | d3 = | 0.362 | | | | |

TABLE 9-continued

| | R | d | | nd | | vd |
|---|---|---|---|---|---|---|
| R3 | −0.869 | d4 = | 0.343 | n2 | 1.614 | v2 | 25.56 |
| R4 | −2.200 | d5 = | 0.233 | | | | |
| F5 | 1.020 | d6 = | 0.779 | n3 | 1.509 | v3 | 56.2 |
| R6 | 1.899 | d7 = | 0.300 | | | | |
| R7 | ∞ | d8 = | 0.300 | n4 | 1.517 | v4 | 64.17 |
| R8 | ∞ | d9 = | 0.493 | | | | |

TABLE 10

| | conic constant | aspheric constant | | | | |
|---|---|---|---|---|---|---|
| | k | A4 | A6 | A8 | A10 | A12 |
| R1 | −9.5468E−01 | 8.2054E−02 | 3.3795E−01 | −2.2566E+00 | 5.9587E+00 | −9.8664E+00 |
| R2 | 0.0000E+00 | −1.4759E−01 | −4.1817E−01 | −1.0193E+00 | −1.8165E+00 | 6.0477E+00 |
| R3 | 0.2676E+00 | −4.0302E−01 | 2.4567E+00 | −8.5395E+00 | 5.5562E+01 | −9.8188E+01 |
| R4 | 1.0240E+00 | −1.3112E+00 | 4.9916E+00 | −1.2324E+01 | 2.2474E+01 | −1.6291E+01 |
| R5 | −9.4578E+00 | −2.7156E−01 | 2.0732E−01 | −4.4481E−02 | −1.4517E−02 | 6.9371E−03 |
| R6 | −3.3073E+00 | −1.8693E−01 | 3.8681E−02 | 1.4525E−03 | −5.4650E−03 | 1.3157E−03 |

Figure 17:
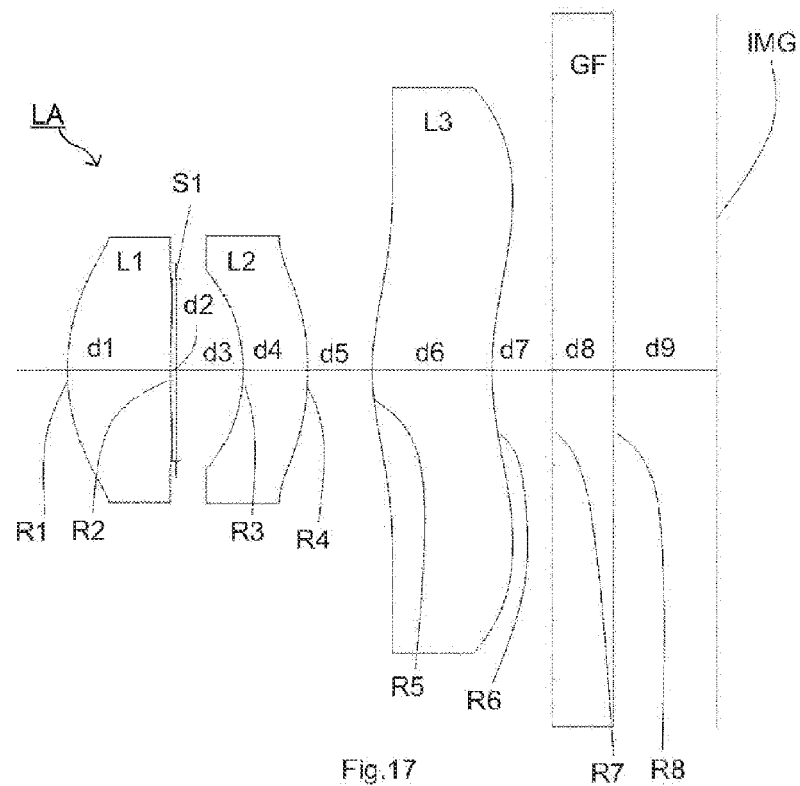
FIG. 17 is a schematic view of the imaging lens according to a fifth embodiment.
Figure 18:
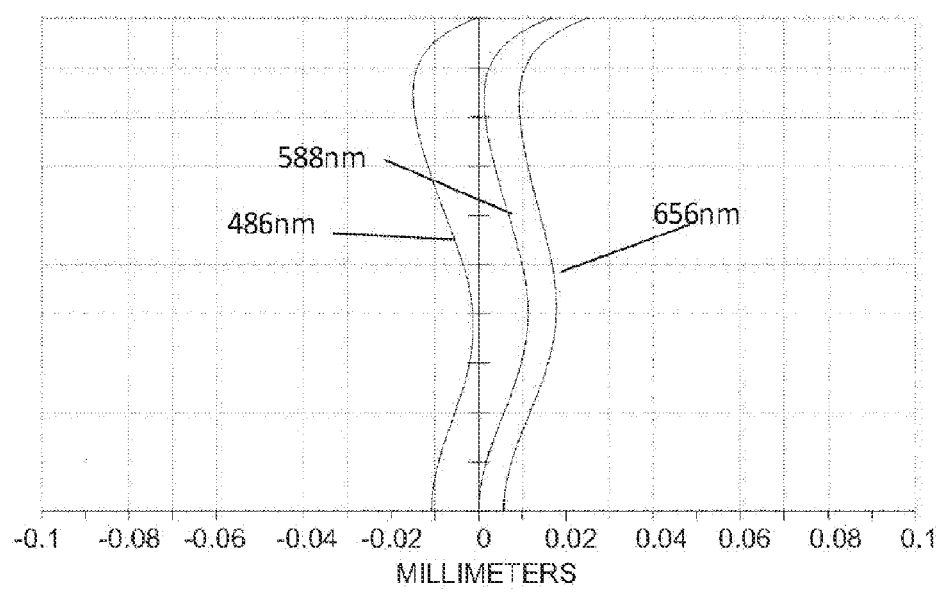
FIGS. 18~19 20A, 20B are graphs respectively showing spherical aberration, lateral color aberration, astigmatism and distortion of FIG. 17.
Figure 19:
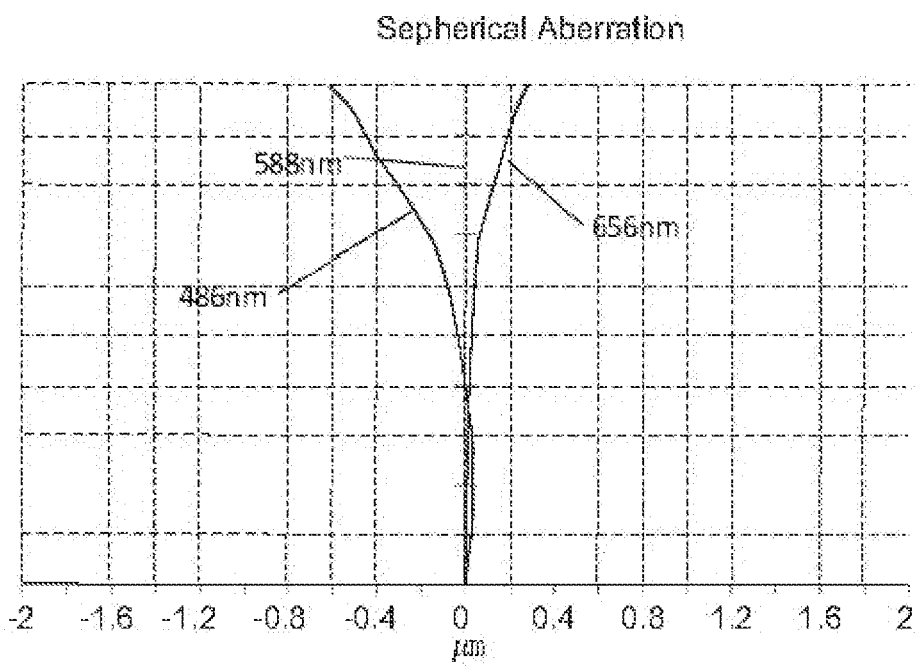
Figures 20A, 20B:
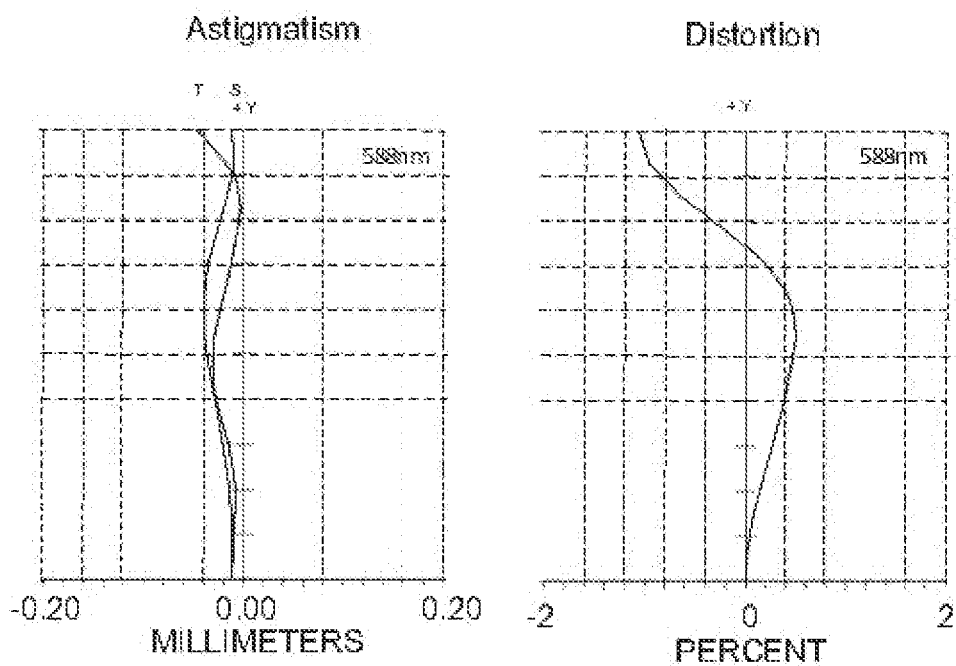

Referring to FIG. 17, an imaging lens LA according to a fifth embodiment is shown. FIGS. 18-20B, are graphs of aberrations (spherical aberration, lateral color aberration, astigmatism, and distortion) of the fifth specification of the exemplary embodiment of the imaging lens LA. In FIGS. 18 and 19, curves are spherical aberration and lateral color aberration characteristic curves of F light (wavelength: 486 nm), d light (wavelength: 588 nm) and C light (wavelength: 656 nm) of the imaging lens LA. The spherical aberration of the fifth specification of the exemplary embodiment is from −0.1 mm to 0.1 mm, the lateral color aberration of the first specification of the exemplary embodiment is from −2 mm to 2 mm. As illustrated in FIG. 20A, the astigmatism is shown at the d light (wavelength: 588 nm) for both the sagittal image surface S and the tangential image surface T. The astigmatism of the fifth specification of the exemplary embodiment of the imaging lens LA is from −0.2 mm to 0.2 mm. In FIG. 20B, the distortion of the fifth specification of the exemplary embodiment of the imaging lens LA is from −2% to 2%.

In the fifth specification, not only the overall length of the imaging lens LA is reduced and the brightness is ensured (seen in Table 19, TTL=3.299 mm, FNo=2.4), but also aberrations of the imaging lens LA are maintained within an acceptable range. That is, the imaging lens LA keeps lateral color aberration at a minimum while reducing the total length of the imaging lens LA.

Figure 21:
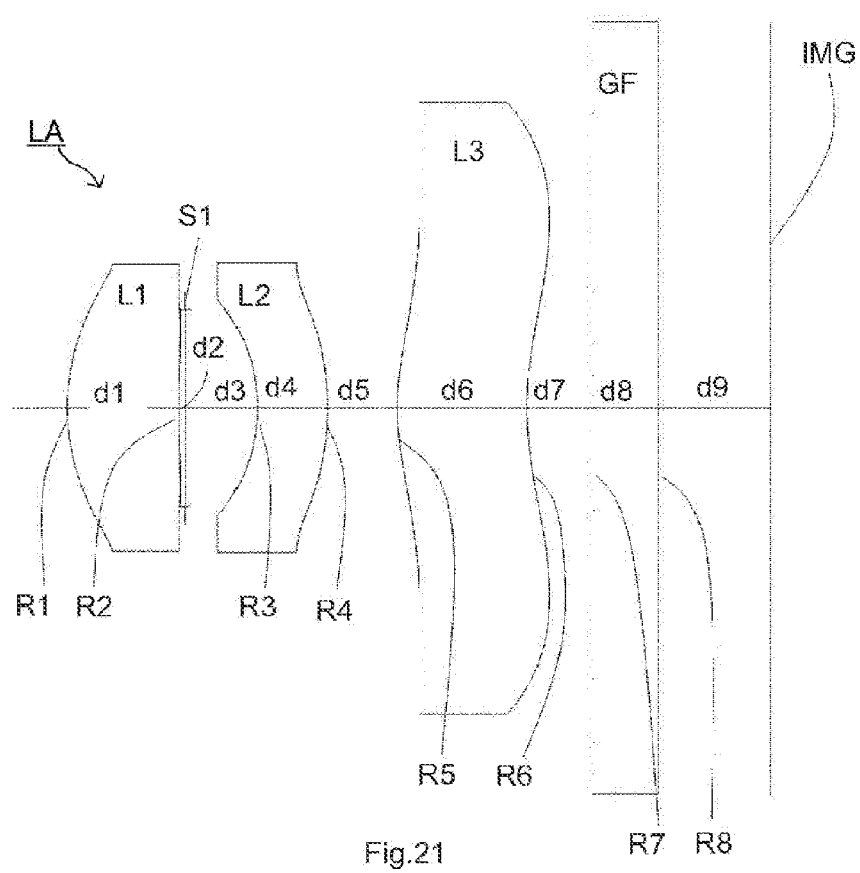
FIG. 21 is a schematic view of the imaging lens according to a sixth embodiment.
Figure 22:
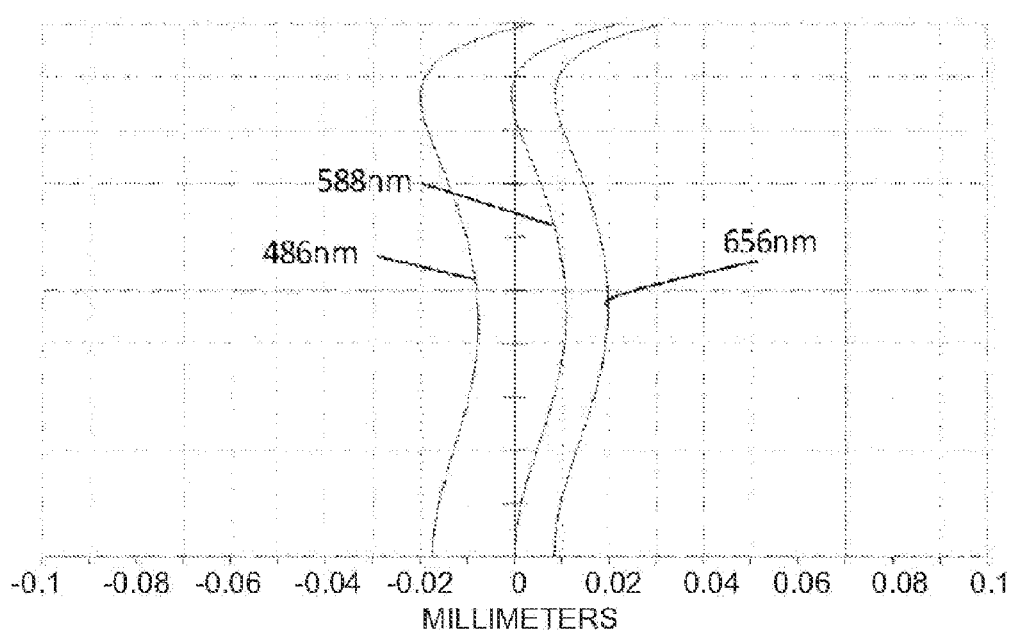
FIGS. 22~23 24A, 24B are graphs respectively showing spherical aberration, lateral color aberration, astigmatism and distortion of FIG. 21.
Figure 23:
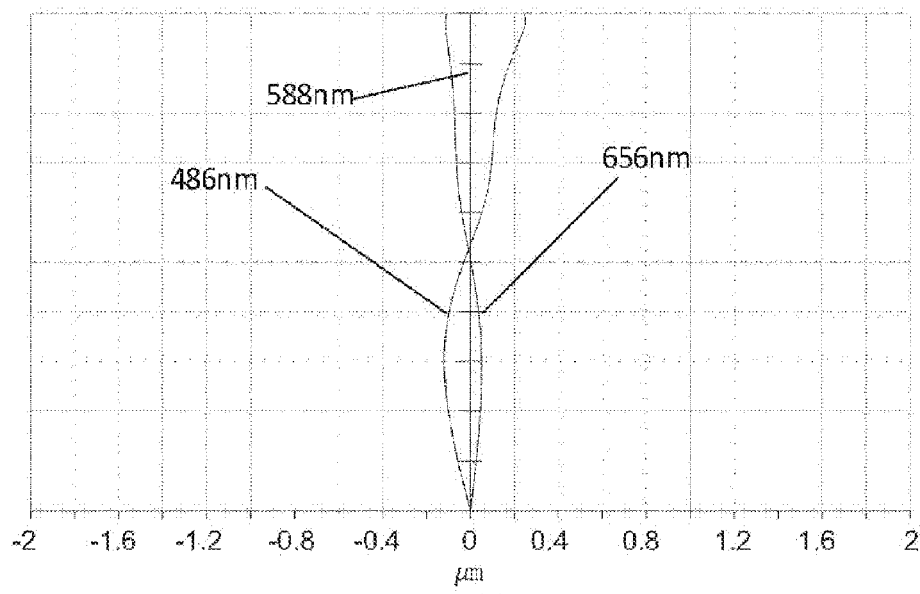
Figure 24A:
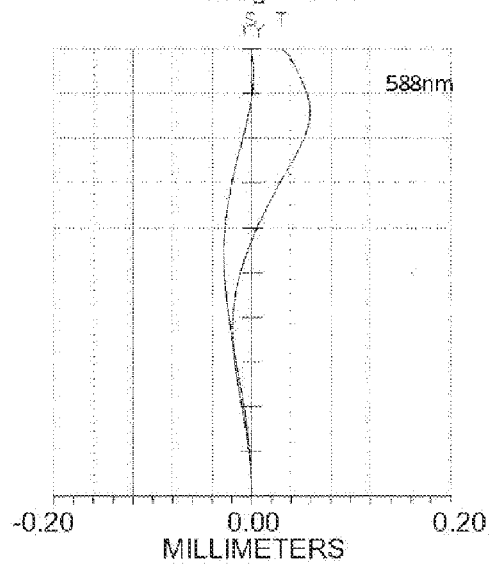
Figure 24B:
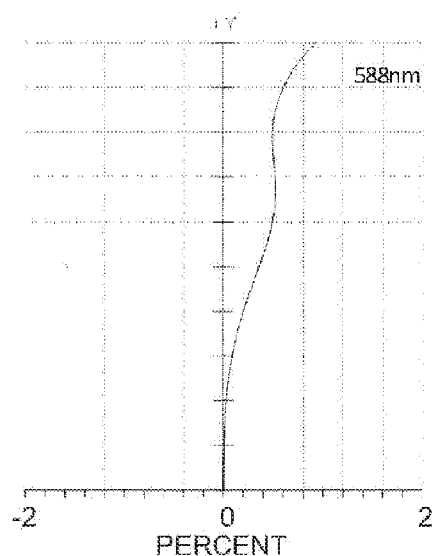

Referring to FIG. 21, an imaging lens LA according to a sixth embodiment is shown. FIGS. 22-24B, are graphs of aberrations (spherical aberration, lateral color aberration, astigmatism, and distortion) of the sixth specification of the exemplary embodiment of the imaging lens LA. In FIGS. 22 and 23, curves are spherical aberration and lateral color aberration characteristic curves of F light (wavelength: 486 nm), d light (wavelength: 588 nm) and C light (wavelength: 656 nm) of the imaging lens LA. The spherical aberration of the sixth specification of the exemplary embodiment is from −0.1 mm to 0.1 mm, the lateral color aberration of the sixth specification of the exemplary embodiment is from −2 mm to 2 mm. As illustrated in FIG. 24A, the astigmatism is shown at the d light (wavelength: 588 nm) for both the sagittal image surface S and the tangential image surface T. The astigmatism of the sixth specification of the exemplary embodiment of the imaging lens LA is from −0.2 mm to 0.2 mm. In FIG. 24B, the distortion of the sixth specification of the exemplary embodiment of the imaging lens LA is from −2% to 2%.

In the sixth specification, not only the overall length of the imaging lens LA is reduced and the brightness is ensured (seen in Table 19, TTL=3.118 mm, FNo=2.4), but also aberrations of the imaging lens LA are maintained within an acceptable range. That is, the imaging lens LA keeps lateral color aberration at a minimum while reducing the total length of the imaging lens LA.

Tables 13-14 show a seventh specification of the seventh embodiment of the imaging lens LA.

Tables 11-12 show a sixth specification of the sixth embodiment of the imaging lens LA.

TABLE 11

|    | R      | d    |       | nd    |    | vd    |
|----|--------|------|-------|-------|----|-------|
| R1 | 0.987  | d1 = | 0.482 | n1 1.544 | v1 | 56.12 |
| R2 | 5.467  | d2 = | 0.016 |       |    |       |
| S1 | ∞      | d3 = | 0.330 |       |    |       |
| R3 | −0.831 | d4 = | 0.285 | n2 1.614 | v2 | 25.56 |
| R4 | −1.359 | d5 = | 0.391 |       |    |       |
| F5 | 1.184  | d6 = | 0.615 | n3 1.509 | v3 | 56.2  |
| R6 | 1.351  | d7 = | 0.300 |       |    |       |
| R7 | ∞      | d8 = | 0.300 | n4 1.517 | v4 | 64.17 |
| R8 | ∞      | d9 = | 0.399 |       |    |       |

TABLE 12

|    | conic constant | aspheric constant | | | | |
|----|----|----|----|----|----|----|
|    | k | A4 | A6 | A8 | A10 | A12 |
| R1 | −1.0827E+00 | 6.7724E−02 | 5.0458E−01 | −2.4967E+00 | 5.8925E+00 | −1.0552E+01 |
| R2 | 0.0000E+00 | −2.2275E−01 | −2.8748E−01 | −2.5520E+00 | −1.3605E+00 | 1.4063E+01 |
| R3 | 7.5640E−01 | −5.9907E−01 | 1.9548E+00 | −9.6560E−01 | 2.3731E+01 | −6.5461E+01 |
| R4 | −5.5734E+00 | −1.2184E+00 | 4.6134E+00 | −1.2060E+01 | 2.7970E+01 | −2.4183E+01 |
| R5 | −8.3500E+00 | −2.8103E−01 | 2.0097E−01 | −4.6032E−02 | −1.4549E−02 | 7.9244E−03 |
| R6 | −6.5530E+00 | −1.6060E−01 | 3.9589E−02 | −1.6217E−04 | −6.0662E−03 | 1.4256E−03 |

TABLE 13

|    | R      | d    |       | nd    |    | vd    |
|----|--------|------|-------|-------|----|-------|
| R1 | 0.995  | d1 = | 0.480 | n1 1.544 | v1 | 56.12 |
| R2 | 5.154  | d2 = | 0.029 |       |    |       |
| S1 | ∞      | d3 = | 0.327 |       |    |       |
| R3 | −0.838 | d4 = | 0.284 | n2 1.614 | v2 | 25.56 |
| R4 | −1.356 | d5 = | 0.382 |       |    |       |
| F5 | 1.190  | d6 = | 0.614 | n3 1.509 | v3 | 56.2  |
| R6 | 1.340  | d7 = | 0.300 |       |    |       |
| R7 | ∞      | d8 = | 0.300 | n4 1.517 | v4 | 64.17 |
| R8 | ∞      | d9 = | 0.437 |       |    |       |

TABLE 14

| | conic constant | aspheric constant | | | | |
|---|---|---|---|---|---|---|
| | k | A4 | A6 | A8 | A10 | A12 |
| R1 | −1.0573E+00 | 7.2007E−02 | 4.4528E−01 | −2.4464E+00 | 6.2377E+00 | −1.0565E+01 |
| R2 | 0.0000E+00 | −2.0849E−01 | −3.0311E−01 | −2.1799E+00 | −5.2067E−01 | 9.0882E+00 |
| R3 | 7.5900E−01 | −5.8946E−01 | 2.3074E+00 | −2.1978E+00 | 2.2606E+01 | −5.7180E+01 |
| R4 | −6.0085E+00 | −1.2097E+00 | 4.6043E+00 | −1.2112E+01 | 2.7825E+01 | −2.4025E+01 |
| R5 | −8.2489E+00 | −2.8001E−01 | 2.0111E−01 | −4.6017E−02 | −1.4788E−02 | 7.4935E−03 |
| R6 | −6.3076E+00 | −1.5981E−01 | 3.9569E−02 | −4.8417E−04 | −6.3165E−03 | 1.2873E−03 |

Figure 25:
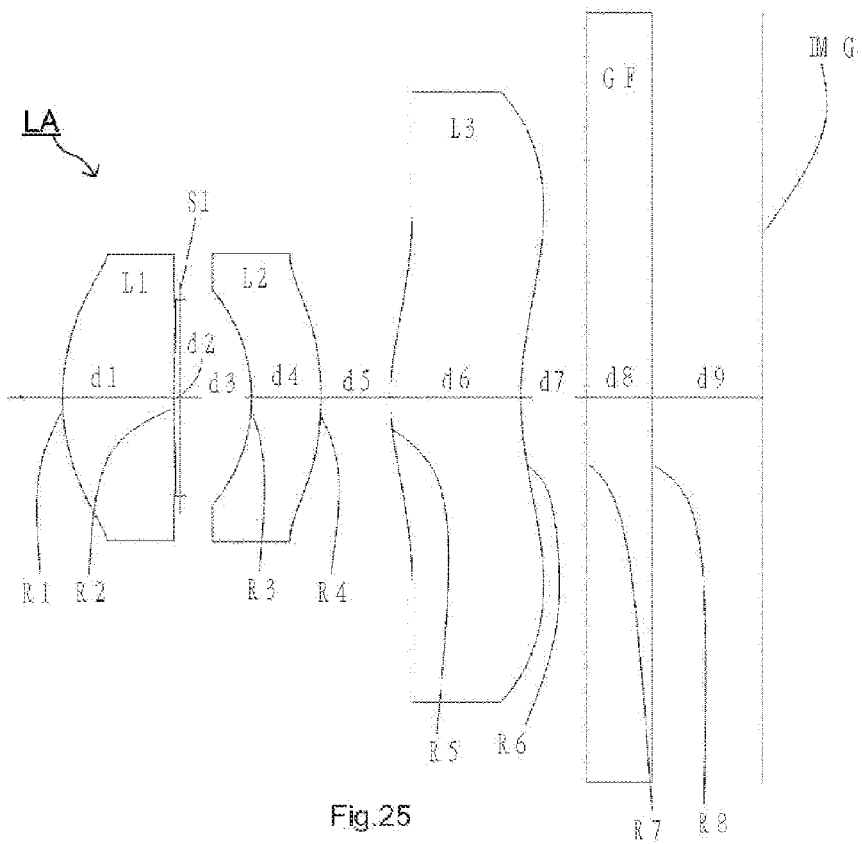
FIG. 25 is a schematic view of the imaging lens according to a seventh embodiment.
Figure 26:
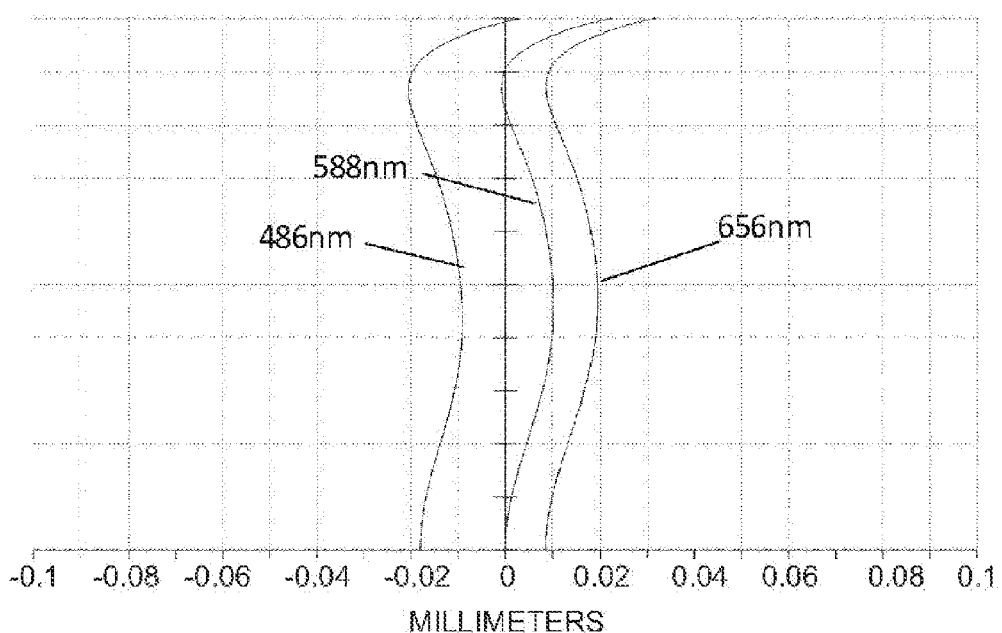
FIGS. 26~27 28A, 28B are graphs respectively showing spherical aberration, lateral color aberration, astigmatism and distortion of FIG. 25.
Figure 27:
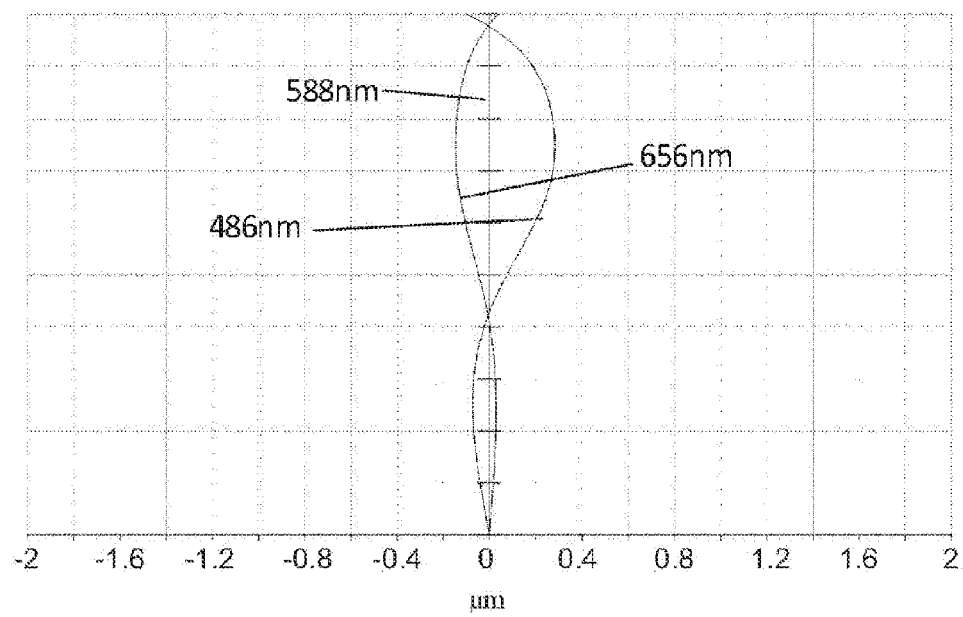
Figure 28A:
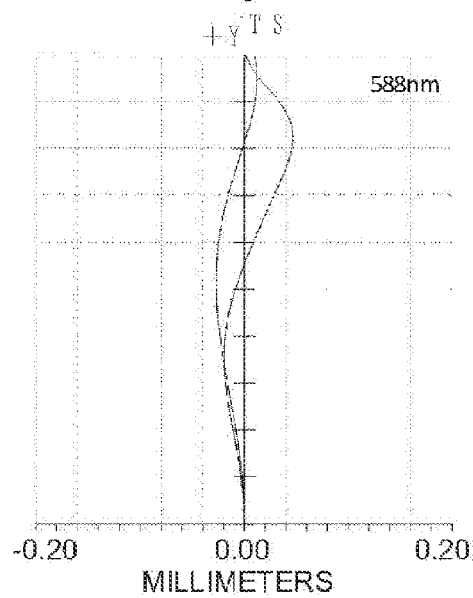
Figure 28B:
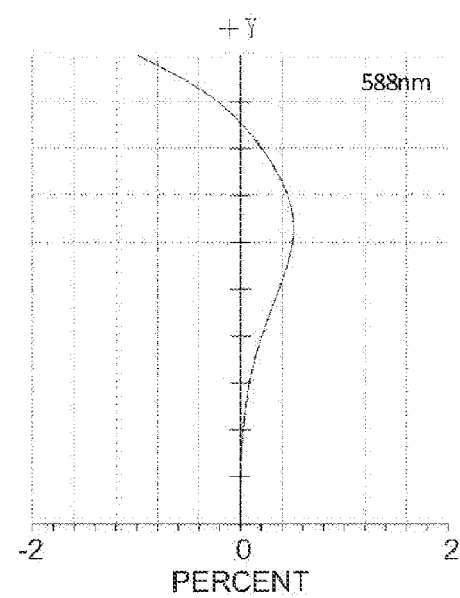

Referring to FIG. 25, an imaging lens LA according to a seventh embodiment is shown. FIGS. 26-28B, are graphs of aberrations (spherical aberration, lateral color aberration, astigmatism, and distortion) of the seventh specification of the exemplary embodiment of the imaging lens LA. In FIGS. 26 and 27, curves are spherical aberration and lateral color aberration characteristic curves of F light (wavelength: 486 nm), d light (wavelength: 588 nm) and C light (wavelength: 656 nm) of the imaging lens LA. The spherical aberration of the seventh specification of the exemplary embodiment is from −0.1 mm to 0.1 mm, the lateral color aberration of the seventh specification of the exemplary embodiment is from −2 mm to 2 mm. As illustrated in FIG. 28A, the astigmatism is shown at the d light (wavelength: 588 nm) for both the sagittal image surface S and the tangential image surface T. The astigmatism of the seventh specification of the exemplary embodiment of the imaging lens LA is from −0.2 mm to 0.2 mm. In FIG. 28B, the distortion of the seventh specification of the exemplary embodiment of the imaging lens LA is from −2% to 2%.

In the seventh specification, not only the overall length of the imaging lens LA is reduced and the brightness is ensured (seen in Table 19, TTL=3.153 mm, FNo=2.4), but also aberrations of the imaging lens LA are maintained within an acceptable range. That is, the imaging lens LA keeps lateral color aberration at a minimum while reducing the total length of the imaging lens LA.

Tables 15-16 show an eighth specification of the eighth embodiment of the imaging lens LA.

Figure 29:
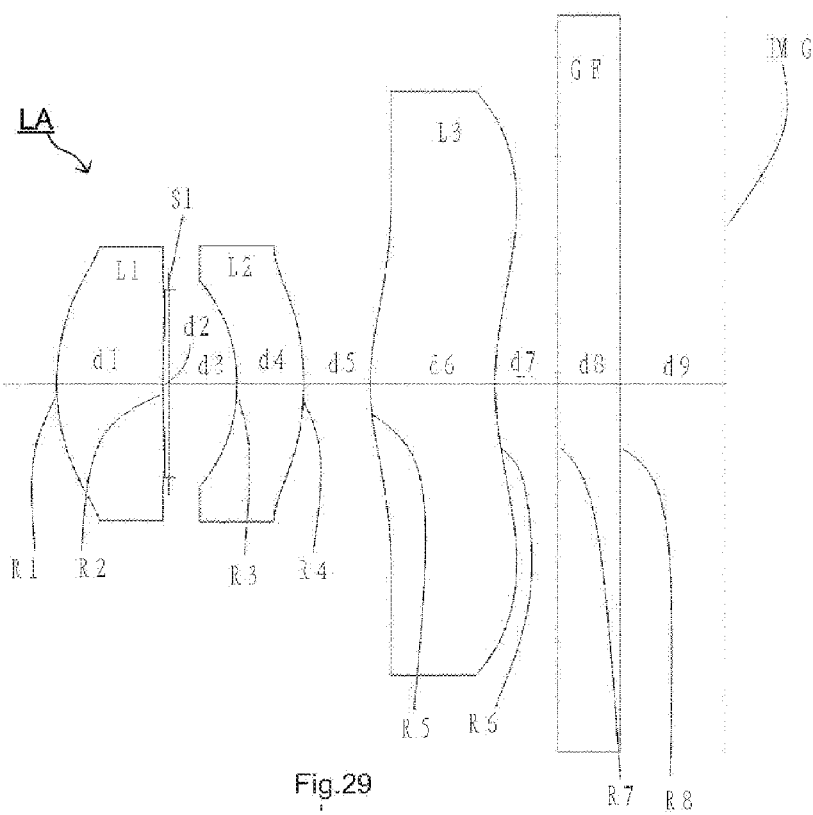
FIG. 29 is a schematic view of the imaging lens according to an eighth embodiment.
Figure 30:
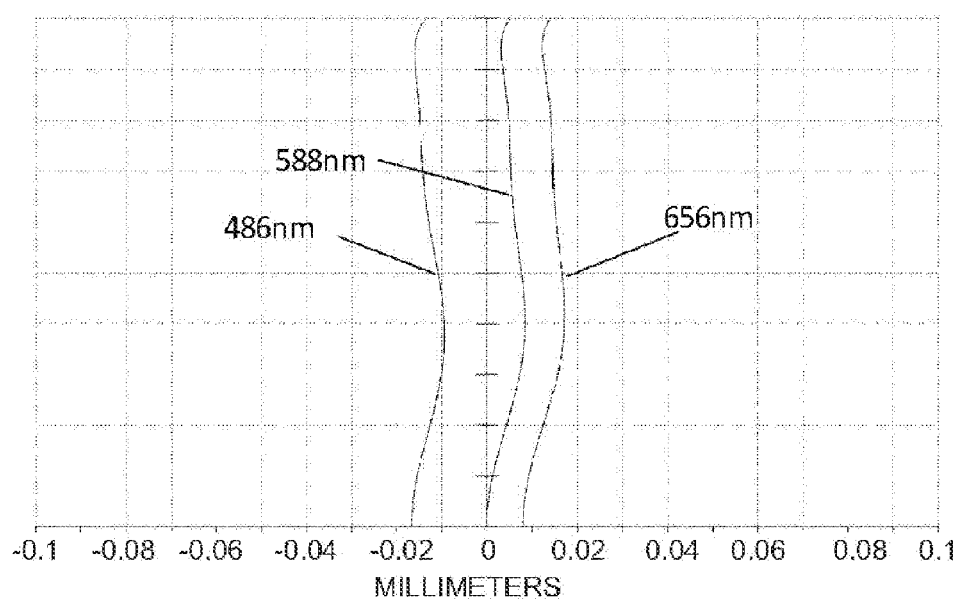
FIGS. 30~31, 32A, 32B are graphs respectively showing spherical aberration, lateral color aberration, astigmatism and distortion of FIG. 29.
Figure 31:
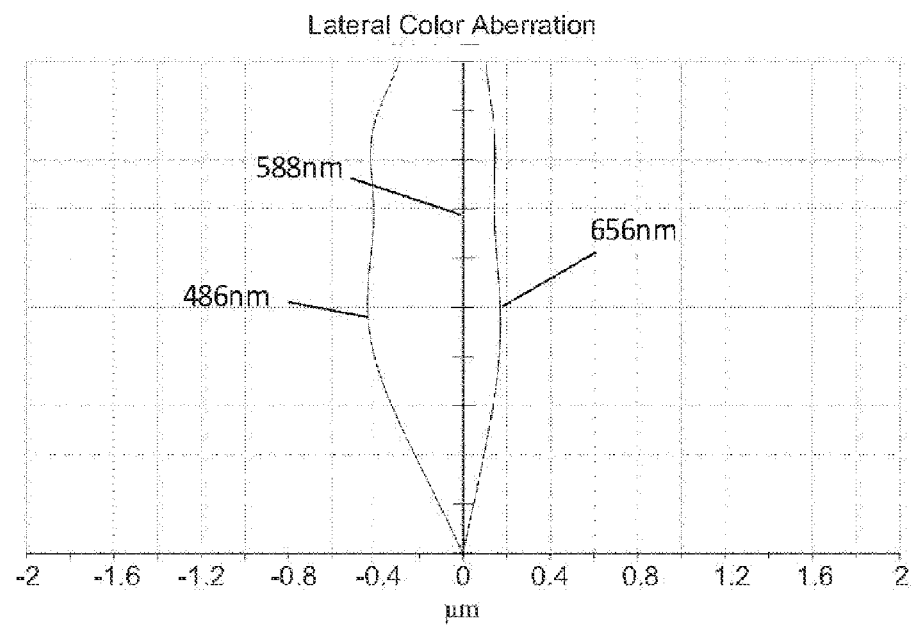
Figures 32A, 32B:
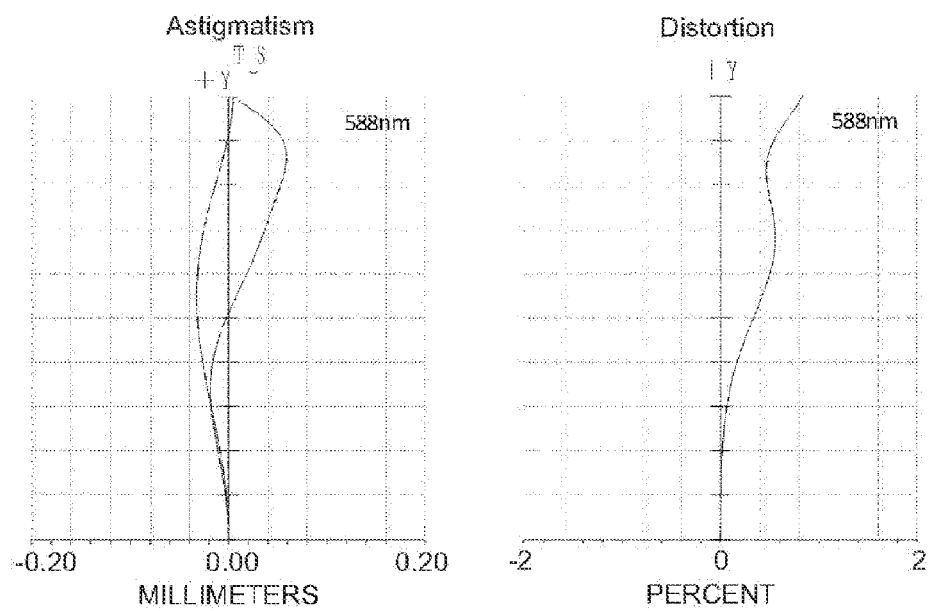

Referring to FIG. 29, an imaging lens LA according to an eighth embodiment is shown. FIGS. 30-32B, are graphs of aberrations (spherical aberration, lateral color aberration, astigmatism, and distortion) of the eighth specification of the exemplary embodiment of the imaging lens LA. In FIGS. 30 and 31, curves are spherical aberration and lateral color aberration characteristic curves of F light (wavelength: 486 nm), d light (wavelength: 588 nm) and C light (wavelength: 656 nm) of the imaging lens LA. The spherical aberration of the eighth specification of the exemplary embodiment is from −0.1 mm to 0.1 mm, the lateral color aberration of the eighth specification of the exemplary embodiment is from −2 mm to 2 mm. As illustrated in FIG. 32A, the astigmatism is shown at the d light (wavelength: 588 nm) for both the sagittal image surface S and the tangential image surface T. The astigmatism of the eighth specification of the exemplary embodiment of the imaging lens LA is from −0.2 mm to 0.2 mm. In FIG. 32B, the distortion of the eighth specification of the exemplary embodiment of the imaging lens LA is from −2% to 2%.

In the eighth specification, not only the overall length of the imaging lens LA is reduced and the brightness is ensured (seen in Table 19, TTL=3.208 mm, FNo=2.4), but also aberrations of the imaging lens LA are maintained within an acceptable range. That is, the imaging lens LA keeps lateral color aberration at a minimum while reducing the total length of the imaging lens LA.

Tables 17-18 show a ninth specification of the ninth embodiment of the imaging lens LA.

TABLE 15

| | R | d | | nd | | vd |
|---|---|---|---|---|---|---|
| R1 | 1.080 | d1 = | 0.499 | n1 | 1.544 | v1 | 56.12 |
| R2 | 8.994 | d2 = | 0.29 | | | | |
| S1 | ∞ | d3 = | 0.328 | | | | |
| R3 | −0.838 | d4 = | 0.322 | n2 | 1.614 | v2 | 25.56 |
| R4 | −1.402 | d5 = | 0.310 | | | | |
| F5 | 1.153 | d6 = | 0.601 | n3 | 1.509 | v3 | 56.2 |
| R6 | 1.483 | d7 = | 0.300 | | | | |
| R7 | ∞ | d8 = | 0.300 | n4 | 1.517 | v4 | 64.17 |
| R8 | ∞ | d9 = | 0.519 | | | | |

TABLE 17

| | R | d | | nd | | vd |
|---|---|---|---|---|---|---|
| R1 | 0.999 | d1 = | 0.494 | n1 | 1.544 | v1 | 56.12 |
| R2 | 4.078 | d2 = | 0.033 | | | | |
| S1 | ∞ | d3 = | 0.362 | | | | |
| R3 | −0.803 | d4 = | 0.275 | n2 | 1.614 | v2 | 25.56 |
| R4 | −1.784 | d5 = | 0.246 | | | | |
| F5 | 1.042 | d6 = | 0.704 | n3 | 1.509 | v3 | 56.2 |
| R6 | 2.253 | d7 = | 0.300 | | | | |
| R7 | ∞ | d8 = | 0.300 | n4 | 1.517 | v4 | 64.17 |
| R8 | ∞ | d9 = | 0.633 | | | | |

TABLE 16

| | conic constant | aspheric constant | | | | |
|---|---|---|---|---|---|---|
| | k | A4 | A6 | A8 | A10 | A12 |
| R1 | −1.3754E+00 | 3.8244E−02 | 5.4681E−01 | −2.7540E+00 | 5.7230E+00 | −7.7474E+00 |
| R2 | 0.0000E+00 | −2.4177E−01 | −1.1588E−01 | −1.8665E+00 | −6.2905E−01 | 7.7079E+00 |
| R3 | 4.3011E−01 | −4.5054E−01 | 1.5204E+00 | −2.3919E+00 | 3.2335E+01 | −7.8842E+01 |
| R4 | −5.6837E+00 | −1.2030E+00 | 4.5831E+00 | −1.2509E+01 | 2.7175E+01 | −2.2546E+01 |
| R5 | −8.7713E+00 | −2.8461E−01 | 2.0402E−01 | −4.2597E−02 | −1.4375E−02 | 6.2493E−03 |
| R6 | −6.1893E+00 | −1.7114E−01 | 3.9931E−02 | 3.9987E−03 | −6.5233E−03 | 1.0997E−03 |

TABLE 18

| | conic constant | aspheric constant | | | | |
|---|---|---|---|---|---|---|
| | k | A4 | A6 | A8 | A10 | A12 |
| R1 | −9.5285E−01 | 8.2963E−02 | 4.3516E−01 | −2.2996E+00 | 5.9530E+00 | −8.6045E+00 |
| R2 | 0.0000E+00 | −1.8312E−01 | −4.7185E−02 | −2.2598E+00 | −1.4013E+00 | 9.6054E+00 |
| R3 | 1.0669E+00 | −4.6847E−01 | 2.6154E+00 | −3.8855E+00 | 3.3462E+01 | −3.6647E+01 |
| R4 | 8.7536E−01 | −1.3016E+00 | 4.8469E+00 | −1.1692E+01 | 2.4320E+01 | −1.9766E+01 |
| R5 | −9.7072E+00 | −2.7887E−01 | 2.0406E−01 | −4.4744E−02 | −1.3738E−02 | 7.6965E−03 |
| R6 | −5.4671E+00 | −1.8687E−01 | 3.7240E−02 | −3.3943E−04 | −5.6233E−03 | 1.6079E−03 |

Figure 33:
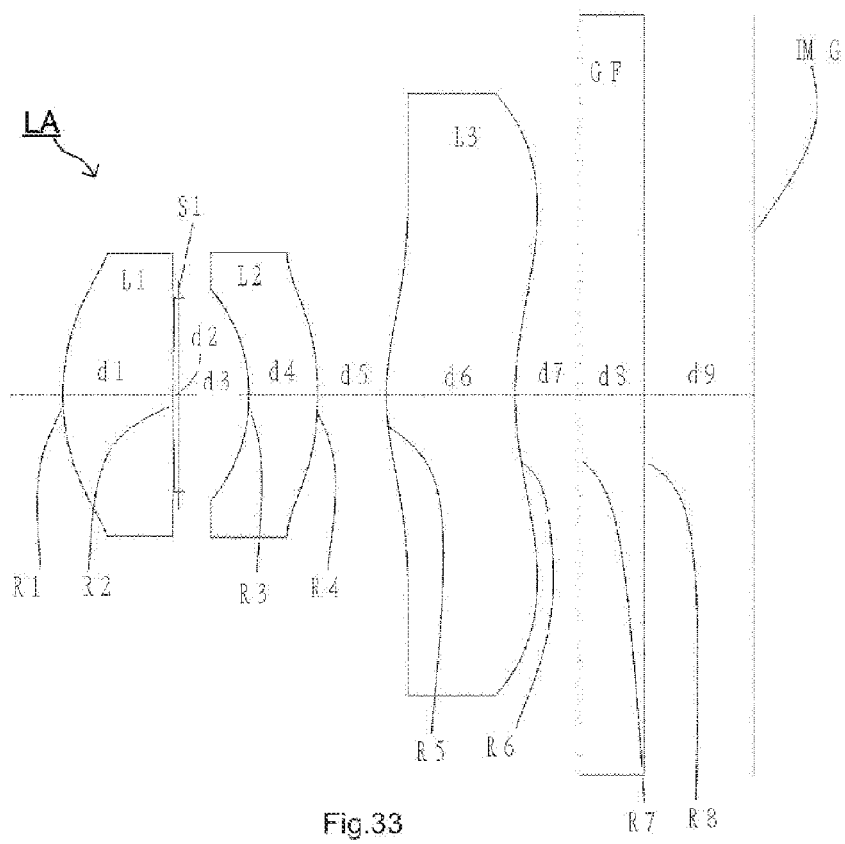
FIG. 33 is a schematic view of the imaging lens according to a ninth embodiment.
Figure 34:
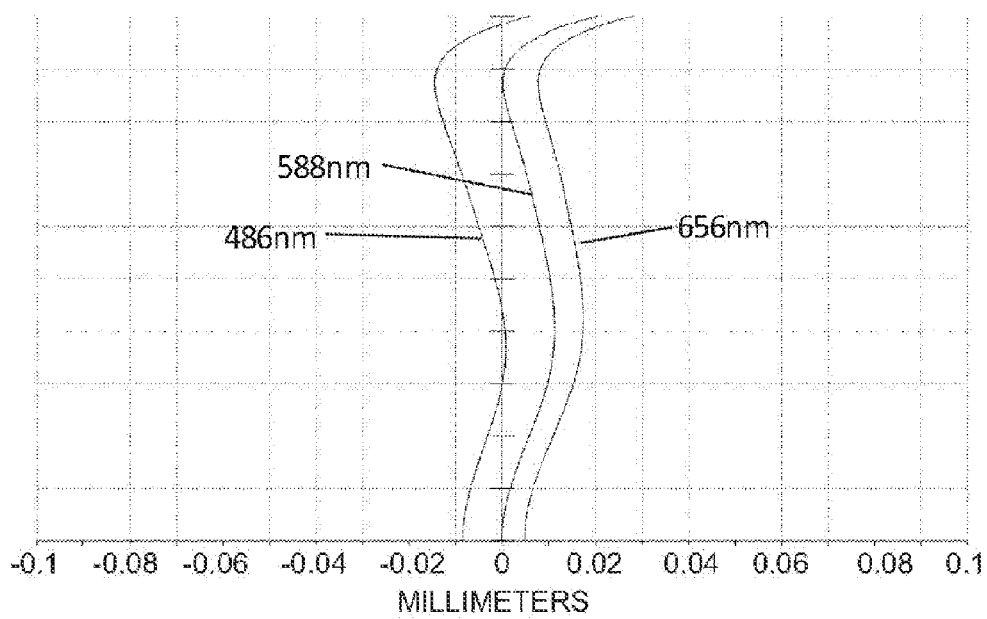

Referring to FIG. 33, an imaging lens LA according to a ninth embodiment is shown. FIGS. 34-36B, are graphs of aberrations (spherical aberration, lateral color aberration, astigmatism, and distortion) of the ninth specification of the exemplary embodiment of the imaging lens LA. In FIGS. 34 and 35, curves are spherical aberration and lateral color aberration characteristic curves of F light (wavelength: 486 nm), d light (wavelength: 588 nm) and C light (wavelength: 656 nm) of the imaging lens LA. The spherical aberration of the ninth specification of the exemplary embodiment is from −0.1 mm to 0.1 mm, the lateral color aberration of the ninth specification of the exemplary embodiment is from −2 mm to 2 mm. As illustrated in FIG. 36A, the astigmatism is shown at the d light (wavelength: 588 nm) for both the sagittal image surface S and the tangential image surface T. The astigmatism of the ninth specification of the exemplary embodiment of the imaging lens LA is from −0.2 mm to 0.2 mm. In FIG. 36B, the distortion of the ninth specification of the exemplary embodiment of the imaging lens LA is from −2% to 2%.

In the ninth specification, not only the overall length of the imaging lens LA is reduced and the brightness is ensured (seen in Table 19, TTL=3.347 mm, FNo=2.4), but also aberrations of the imaging lens LA are maintained within an acceptable range. That is, the imaging lens LA keeps lateral color aberration at a minimum while reducing the total length of the imaging lens LA.

Table 19 shows every specification of the above embodiments, every numerical value is met with the conditions (1)~(8) shown above.

While certain embodiments have been described and exemplified above, various other embodiments will be apparent to those skilled in the art from the foregoing disclosure. The disclosure is not limited to the particular embodiments described and exemplified, and the embodiments are capable of considerable variation and modification without departure from the scope of the appended claims.

What is claimed is:

1. An imaging lens, in the order from the object-side to the image-side of the imaging lens, comprising:

a first lens of positive refraction power, with a convex surface on the object-side; an aperture stop, wherein the aperture stop is installed between the first lens and the second lens;

a second lens of negative refraction power, with a convex surface on the image-side;

a third lens of positive refraction power, with a convex surface on the object-side;

wherein the imaging lens satisfies the following conditions:

$0.80 \leq f1/f \leq 0.87$; $-2.00 \leq f2/f \leq -0.90$; $0.35 \leq R3/R4 \leq 0.65$; $0.01 \leq d2/d3 \leq 0.15$; and $0.08 \leq d5/f \leq 0.18$;

Wherein: F is a focal length of the imaging lens; f1 is a focal length of the first lens; f2 is a focal length of the second lens; R3 is a radius of curvature of the object-side surface of the second lens; R4 is a radius of curvature of the image-side surface of the second lens; d2 is a distance between the image-side surface of the first lens and the aperture stop on the optical axis of imaging lens; d3 is a distance between the aperture stop and the object-side surface of the second lens on the optical axis of imaging lens; d5 is distance between the image-side surface of

TABLE 19

| | embodiment 1 | embodiment 2 | embodiment 3 | embodiment 4 | embodiment 5 | embodiment 6 | embodiment 7 | embodiment 8 | embodiment 9 | remark |
|---|---|---|---|---|---|---|---|---|---|---|
| f1/f | 0.806 | 0.859 | 0.848 | 0.830 | 0.843 | 0.830 | 0.831 | 0.857 | 0.846 | formula (1) |
| f2/f | −1.448 | −1.685 | −1.850 | −0.940 | −0.990 | −1.703 | −1.721 | −1.682 | −0.942 | formula (2) |
| R3/R4 | 0.569 | 0.599 | 0.630 | 0.431 | 0.395 | 0.611 | 0.618 | 0.597 | 0.450 | formula (3) |
| d2/d3 | 0.079 | 0.095 | 0.080 | 0.089 | 0.091 | 0.048 | 0.089 | 0.088 | 0.091 | formula (4) |
| d5/f | 0.120 | 0.119 | 0.132 | 0.095 | 0.089 | 0.152 | 0.146 | 0.120 | 0.090 | formula (5) |
| f3/f | 2.577 | 2.466 | 3.094 | 1.220 | 1.273 | 3.262 | 3.349 | 2.449 | 1.170 | formula (6) |
| R1/R2 | 0.175 | 0.162 | 0.171 | 0.196 | 0.182 | 0.181 | 0.193 | 0.120 | 0.245 | formula (7) |
| v1−v2 | 30.56 | 30.56 | 30.56 | 30.56 | 30.56 | 30.56 | 30.56 | 30.56 | 32.75 | formula (8) |
| FNo | 2.4 | 2.4 | 2.4 | 2.4 | 2.4 | 2.4 | 2.4 | 2.4 | 2.4 | |
| 2ω | 67.3 | 68.0 | 68.0 | 66.3 | 68.0 | 68.0 | 68.0 | 68.0 | 66.0 | |
| f | 2.656 | 2.574 | 2.617 | 2.708 | 2.621 | 2.571 | 2.621 | 2.573 | 2.720 | |
| f1 | 2.141 | 2.210 | 2.220 | 2.248 | 2.210 | 2.134 | 2.179 | 2.206 | 2.301 | |
| f2 | −3.846 | −4.336 | −4.841 | −2.546 | −2.594 | −4.379 | −4.512 | −4.328 | −2.562 | |
| f3 | 6.844 | 6.348 | 8.097 | 30.304 | 3.336 | 8.387 | 8.779 | 6.301 | 3.183 | |
| TTL | 3.201 | 3.185 | 3.178 | 3.350 | 3.299 | 3.118 | 3.153 | 3.208 | 3.347 | |
| LB | 1.108 | 1.103 | 1.138 | 1.172 | 1.093 | 0.999 | 1.037 | 1.119 | 1.233 | |
| IH | 1.75 | 1.75 | 1.75 | 1.75 | 1.75 | 1.75 | 1.75 | 1.75 | 1.75 | | the second lens and the object-side surface of the third lens on the optical axis of imaging lens.

2. The lens system of claim 1, wherein following condition is satisfied: $1.10 \leq f3/f \leq 3.50$; wherein f3 is a focal length of the third lens; F is a focal length of the lens system.

3. The lens system of claim 1, wherein t following condition is satisfied: $0.11 \leq R1/R2 \leq 0.25$; wherein R1 is a curvature radius of the object-side surface of the first lens; R1 is a curvature radius of the image-side surface of the second lens.

4. The lens system of claim 1, wherein the following condition is satisfied: $30.00 \leq v1-v2 \leq 40.00$; wherein v1 is the Abbe number of the first lens; v2 is the Abbe number of the second lens.

* * * * *